(12) United States Patent
Fukuda

(10) Patent No.: US 6,469,239 B1
(45) Date of Patent: Oct. 22, 2002

(54) DATA STORAGE APPARATUS AND DATA STORAGE METHOD WITH QUALITY DEGRADING FEATURES

(75) Inventor: Shinichi Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/403,146

(22) PCT Filed: Feb. 18, 1999

(86) PCT No.: PCT/JP00/00702

§ 371 (c)(1),
(2), (4) Date: Oct. 15, 1999

(87) PCT Pub. No.: WO99/42996

PCT Pub. Date: Aug. 26, 1999

(30) Foreign Application Priority Data

Feb. 19, 1998 (JP) .............................................. 10-67184

(51) Int. Cl.[7] ................................................ G10H 7/00
(52) U.S. Cl. .............................. 84/602; 704/501; 705/51
(58) Field of Search ..................... 84/602–604; 369/112, 369/13, 14; 704/500, 501, 503; 705/51–53

(56) References Cited

U.S. PATENT DOCUMENTS

| 4,740,890 A | * | 4/1988 | Tobin |
| 5,014,234 A | * | 5/1991 | Edwards, Jr. |
| 5,341,429 A | * | 8/1994 | Stringer et al. |
| 5,490,130 A | * | 2/1996 | Akagiri |
| 5,530,750 A | * | 6/1996 | Akagiri |
| 5,949,885 A | * | 9/1999 | Leighton |
| 6,041,316 A | * | 3/2000 | Allen ........................... 705/52 |
| 6,122,618 A | * | 9/2000 | Park ........................... 704/500 |
| 6,122,619 A | * | 9/2000 | Kolluru et al. ............. 704/500 |
| 6,378,010 B1 | * | 4/2002 | Burks |
| 6,385,596 B1 | * | 5/2002 | Wiser et al. |
| 6,389,538 B1 | * | 5/2002 | Gruse et al. |

* cited by examiner

Primary Examiner—Jeffrey Donels
(74) Attorney, Agent, or Firm—Jay H. Maioli

(57) ABSTRACT

When a copy of music data recorded in an HDD to another electronic equipment is instructed, an accounting process is performed or a sound quality deteriorating process is performed based on a selection. When the accounting process is performed, after a predetermined accounting procedure is performed, a data copying process is performed and the data is outputted to a copy destination. When the accounting process is performed, a quality of the data is held to be almost identical to that of the original data. When the sound quality deteriorating process is selected, a data conversion is performed by a predetermined sound quality deteriorating process, the quality of the data is deteriorated, and the deteriorated data is outputted to the copy destination. In this case, the accounting is not performed. Where the data is moved, the accounting process and the sound quality deteriorating process are not performed.

30 Claims, 13 Drawing Sheets

DATA STORAGE APPARATUS AND DATA STORAGE METHOD WITH QUALITY DEGRADING FEATURES

TECHNICAL FIELD

The invention relates to a recording and reproducing apparatus, a recording and reproducing method, and a data processing apparatus. More particularly, the invention relates to a recording and reproducing apparatus, a recording and reproducing method, and a data processing apparatus for performing a copy of data or an operation similar to the copy.

BACKGROUND ART

Hitherto, in association with the development of the digital technique, as well as a recording medium such as a CD (Compact Disc) or the like, there are many examples in which audio information or audio data is supplied as digital music data. As for the digital music data, the reproduction at a high sound quality can be relatively easily realized and a deterioration of the sound quality due to the recording to the recording medium hardly occurs. As compared with a case where the conventional analog audio signal has been recorded on the recording medium, a recording medium in which digital music data has been recorded has widely generally been spread because it is relatively small and light-weighted and the like.

On the other hand, as for the digital music data, since a deterioration of the sound quality due to a recording medium hardly occurs and a perfect copy can be easily performed and the like, there is a fear such that the copyright is threatened by a limitless copy or the like. Hitherto, as a countermeasure for protection of the copyright, a management by SCMS (Serial Copy Management System) has been performed with respect to the copy (dubbing) of digital music data including the copyright. In the management by the SCMS, a predetermined flag is provided for the digital music data and the copy as digital data is limited to, for example, one generation. The SCMS is used as a digital interface of a recording and reproducing apparatus or the like using a commercially available DAT (Digital Audio Tape) or a magnetooptical disc having a diameter of almost 64 mm.

However, the above SCMS has a problem such that since importance is fairly attached to the protection of the copyright, sharing performance of data is remarkably limited.

For example, even for the purpose of a personal use, the music data obtained by copying digital data can be never transferred from a recording medium on which digital data was copied to another recording medium and it is very inconvenient.

DISCLOSURE OF INVENTION

It is, therefore, an object of the invention to provide a recording system which can perform digital move and copy of digital music data to another recording medium while protecting the copyright.

According to the invention, to solve the above problem, there is provided a recording and reproducing apparatus comprising: a first storing unit in which at least one data has been stored; a second storing unit in which at least one data is recorded; and signal processing means to which the data read out from the first storing unit is supplied when the data read out from the first storing unit is stored into the second storing unit and which performs a deteriorating process of the supplied data and supplies resultant processed data to the second storing unit. According to the invention, there is also provided a recording and reproducing method whereby when the data read out from the first storing unit is stored into the second storing unit, a deteriorating process of the data is performed to the data read out from the first storing unit and resultant processed data is supplied to the second storing unit and written into the second storing unit.

According to the invention, there is provided a recording and reproducing apparatus comprising: a first storing unit in which at least one data has been stored; a second storing unit in which at least one data is recorded; and control means to which the data read out from the first storing unit is supplied and in which when the data read out from the first storing unit is stored into the second storing unit, either one of an accounting process and a deteriorating process of the data supplied from the first storing unit is performed and resultant processed data is supplied to the second storing unit.

According to the invention, there is provided a recording and reproducing method whereby when data read out from a first storing unit is stored into a second storing unit, either one of an accounting process and a deteriorating process of the data supplied from the first storing unit is performed and resultant processed data is supplied to the second storing unit.

According to the invention, there is provided a data processing apparatus comprising: a storing unit in which at least one data has been stored; and signal processing means to which the data read out from the storing unit is supplied when the data read out from the storing unit is stored when it is copied to another storing medium and which performs a deteriorating process of the supplied data and outputs the data obtained by performing the data deteriorating process as output data.

As mentioned above, according to the invention, when the data read out from the first storing unit in which at least one data has been stored is stored into the second storing unit in which at least one data has been stored, the deteriorating process is performed to the data read out from the first storing unit, so that the illegal use of the data read out from the first storing unit is prevented.

According to the invention, when the data read out from the first storing unit in which at least one data has been stored is stored into the second storing unit in which at least one data has been stored, either one of the accounting process and the deteriorating process of the data read out from the first storing unit can be selected, such that if the accounting process is performed, the data deteriorating process is not performed.

According to the invention, when the data read out from the storing unit in which at least one data has been stored is copied to another storing medium, since the deteriorating process is performed to the data read out from the storing unit and the resultant processed data is used as output data, the illegal use of the data that is read out from the storing unit and is outputted so as to be copied to another storing medium is prevented.

BEST MODE FOR CARRYING OUT THE INVENTION

Figure 1:
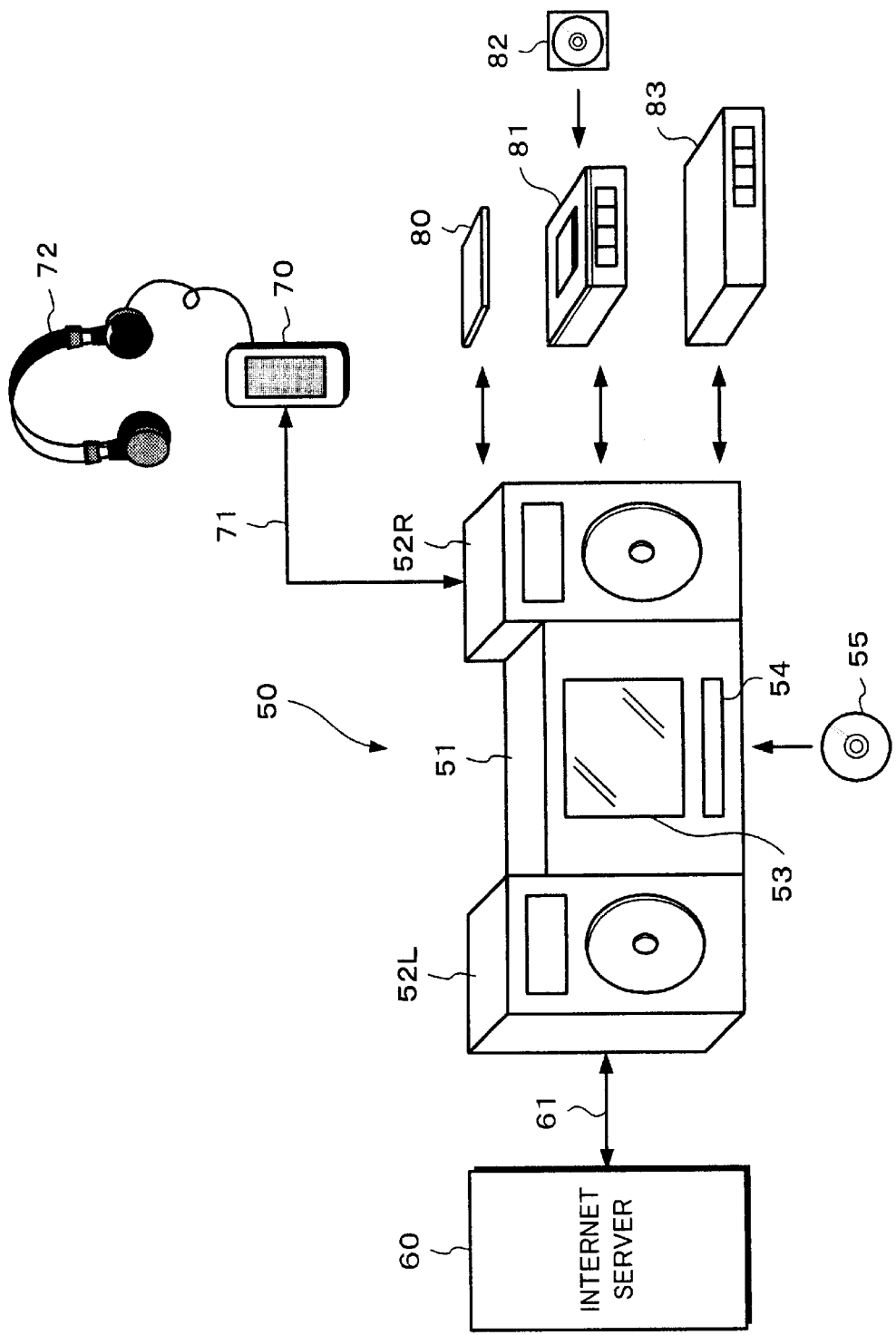
FIG. 1 is a schematic diagram schematically showing a music server according to the invention and a system using the music server.

The best mode for embodying the invention will now be described hereinbelow with reference to the drawings. FIG. 1 schematically shows a music server to which the invention is applied and a system using the music server. A music server 50 comprises a server main body 51 and right and left speaker units 52R and 52L. A display unit 53 comprising, for example, an LCD (Liquid Crystal Display) panel and a CD inserting portion 54 to insert a CD into the server main body 51 are provided for the server main body 51.

Although not shown in FIG. 1, an operating unit comprising a plurality of operation switches to operate functions of the server main body 51 by the user is provided for the server main body 51. A signal receiving unit to receive, for example, an infrared signal to remote control the functions of the server main body 51 by a remote commander can be also provided. The server main body 51 has a controller as will be explained hereinafter. Various operations of the server main body 51 are controlled by the controller on the basis of a predetermined program which has previously been stored in, for instance, an ROM.

The user loads a CD 55 into the server main body 51 through the CD inserting portion 54 and executes a predetermined operation by using an operating unit (not shown), thereby reproducing the CD 55. He can enjoy music recorded on the CD 55 by generating a reproduction signal reproduced from the CD 55 by the speaker units 52L and 52R. When the CD 55 includes text data such as music titles or the like, the music titles or the like are displayed to the display unit 53 on the basis of the text data.

The music server 50 has therein a recording medium of a large capacity by, for example, a hard disk. By executing a predetermined operation by the user by using the operating unit (not shown), the reproduction data reproduced from the CD 55 loaded into the server main body 51 from the CD inserting portion 54 can be recorded to the recording medium comprising a hard disk. In this instance, either one of a method of recording at the same transfer speed as the standard reproducing speed of the CD 55 and a high speed recording to record at a transfer speed higher than the standard reproducing speed of the CD 55 can be selected. In case of recording at the high transfer speed, by executing an accounting process by a predetermined procedure, a desired CD can be selected or a desired music piece recorded on the CD can be selected and the reproduction data as music data reproduced from the CD can be recorded at a transfer speed higher than that of the data reproduced at the standard reproducing speed of the CD.

In the music server 50, the music data reproduced from the CD 55 is compression encoded by a predetermined method such as a foregoing ATRAC or the like and is recorded as compression music data. For example, music data of about 1000 music pieces can be stored to the hard disk having a capacity of 6 GBytes. A list of the titles of the music pieces stored on the hard disk is displayed on, for example, the display unit 53. The user can select an arbitrary one of the music pieces stored on the hard disk on the basis of the music title list displayed in the display unit 53 and can be reproduced. Since a random access can be performed in the hard disk, music data stored can be read out and continuously reproduced in accordance with an arbitrary order.

Although various methods can be used for compression encoding, the method called "ATRAC2 (Adaptive Transform Acoustic Coding 2)" as disclosed in, for example, U.S. Pat. No. 5,717,821 is used in this embodiment. The compression encoding method disclosed in U.S. Pat. No. 5,717,821 intends to perform a compression encoding of audio data by using a masking effect based on the sense of hearing and a frequency dependency of the minimum audible limit and by using both transform coding and entropy coding. The encoding/decoding can be performed at a high speed while maintaining a high sound quality by hardware of a relatively small scale.

The music server 50 can be connected to an external system, for example, an internet server 60 as a server connected to the internet through a communication line 61 such as a public telephone line. By connecting from the music server 50 to the internet server 60 through the communication line 61, various information on the internet can be obtained. The internet server 60 has, for example, a database such as title information of commercially available music CDs. A key peculiar to the user to use the database is given to the user. When the database is used, the authentication is performed on the basis of the peculiar key. After completion of the authentication of the user, the data accompanied in the CD, for example, title information of the CD is transmitted to the user. Thus, the user can obtain the data associated to the CD.

In the internet server 60, an accounting process for the music server 50 is also executed in accordance with services which are presented to the user. When the foregoing high speed recording of the CD 55 is executed, the music server 50 communicates data indicative of the execution of the high speed recording to the internet server 60, so that the accounting process for the user who performs the high speed recording is executed, the selection of the CD or music piece can be performed, and the high speed recording can be executed.

Although the accounting process is executed by the internet server 60 having a large quantity of additional information of the CDs here, the invention is not limited to the foregoing example. For instance, the foregoing accounting process can be also performed by another server connected to the internet. The foregoing accounting process can be also executed by another network, for example, a dedicated network different from the internet.

A portable recording and reproducing apparatus 70 has a storing medium comprising a hard disk or a flash memory. Any other storing medium or recording medium can be also used so long as it can follow the reproducing speed of music. By connecting the portable recording and reproducing apparatus 70 to the music server 50 by a connection line 71, the music data recorded in the music server 50 is transferred to the portable recording and reproducing apparatus 70 and can be recorded to the storing medium of the portable recording and reproducing apparatus 70. In this instance, on the music server 50 side, although the music data transferred to the apparatus 70 exists on the storing medium such as hard disk or flash memory, it is set into a state where the data cannot be reproduced. The storing medium or recording medium which is used in the portable recording and reproducing apparatus 70 has a capacity of, for example, about 200 MBytes and music data of tens of music pieces can be stored. In the following description, a storing device or storing medium comprising a semiconductor memory such as a flash memory or the like and a recording medium such as a disk-like recording medium or the like such as a hard disk or the like are generally called a storing medium.

The foregoing transfer method which is used in the invention, namely, an act such that in case of transferring the music data, the music data is recorded to a storing medium on the transfer destination side, and on the storing medium on the transferring source side, although the transferred music data exists on the storing medium, it is set into an unreproducible state is called a "move". By moving the music data as mentioned above, an unlimited copy of the music data can be prevented.

Although the music server 50 and portable recording and reproducing apparatus 70 are connected by the connection line 71 in the above embodiment, the invention is not limited to this example. For instance, it is also possible to construct in a manner such that mutually corresponding attaching portions are provided for both of the music server 50 and portable recording and reproducing apparatus 70, the portable recording and reproducing apparatus 70 are directly attached to the music server 50, and data is transmitted and received between the server 50 and apparatus 70. Besides the electric connection, for example, interfaces corresponding to IrDA (Infrared Data Association) for transmitting and receiving data by an infrared signal are provided for both of the server 50 and apparatus 70 and the music data can be also transferred between the server 50 and apparatus 70 by the infrared signal.

Further, by providing a predetermined interface for the music server 50, information can be exchanged for various media. For example, by providing an interface corresponding to a PC card 80 for the server 50, music data which is distributed by the PC card 80 can be fetched to the music server 50 or data can be transmitted and received between a personal computer and the music server 50. By providing a serial digital interface by an optical cable or the like for the server 50, for example, music data can be transmitted and received to/from another digital music data recording and reproducing apparatus such as a disc recorder 81 using a small magnetooptical disc having a diameter of about 64 mm. In this example, a disc cartridge 82 in which the foregoing small magnetooptical disc is enclosed is loaded into the disc recorder 81 and music data reproduced from the magnetooptical disc of the disc cartridge 82 is supplied to the music server 50. Similarly, it is also possible to provide an interface such as an IEEE 1394 for the server 50 and to connect, for instance, a set top box 83 for a CATV (Cable Television), a satellite broadcasting, or the like.

The PC card conforms to the standard of the card type peripheral equipment for personal computers by the common enactment of the PCMCIA (Personal Memory Card International Association) of U.S.A. and the JEIDA (Japanese Electronic Industry Development Association) of Japan. The IEEE 1394 is an interface standard used in Electrical & Electronics Standards Engineers Association of U.S.A.

The music server 50 can have a WWW (World Wide Web) browser as a built-in application. By connecting to the internet server 60 through the communication line 61, various contents which exist on the internet and were described by, for example, HTML (Hypertext Markup Language) can be retrieved and can be displayed on the display unit 53.

With the above construction, for instance, the user can reproduce the music data memorized or stored in the music server 50 and can listen to it by the speaker units 52L and 52R. The user can also load the CD 55 into the server 50 through the CD inserting portion 54 and can reproduce the CD 55.

By communicating between the music server 50 and internet server 60, the title information or the like of the CD 55 loaded into the server 50 through the CD inserting portion 54 can be automatically obtained from the server 60 through the communication line 61. The information derived from the server 60 is preserved in the music server 50. The preserved title information is displayed on the display unit 53 of the server 50 as necessary. More specifically speaking, information such as user ID data of the server 50 or the like that is peculiar to the user (hereinafter, referred to as user information) is sent from the music server 50 to the internet server 60. On the internet server 60 side, a collating process or an accounting process is executed on the basis of the received user information. Media information of the CD which is needed by the user or the CD which is being reproduced is sent from the music server 50 to the internet server 60. In the internet server 60, on the basis of the received media information, for example, the additional information such as titles of the music pieces, names of the players, names of the composers and songwriters, words, jacket image, and the like for the music data is retrieved. In the internet server 60, predetermined information regarding the CD requested from the user is returned to the music server 50.

For example, TOC (Table Of Contents) information of the CD 55 is sent as media information to the internet server 60. A database in which the additional information for the music data mentioned above can be retrieved is constructed in the internet server 60 on the basis of the TOC information. The additional information can be also obtained by retrieving another WWW server on the internet. The internet server 60 retrieves the additional information of the music data by using the received TOC information as media information. For example, it can be retrieved on the basis of time information of each of the music pieces included in the TOC information and recorded in the CD 55.

The additional information obtained by retrieving is sent from the internet server 60 to the music server 50. In the music server 50, the received additional information is displayed in the display unit 53 and is written to, for example, the hard disk drive together with the TOC information of the CD 55 by a CPU 8, which will be explained hereinafter. By storing the retrieved additional information into an HTML file and sending the file from the server 60, the additional information can be displayed by built-in WWW browser software in the music server 50.

If another URL (Uniform Resource Locator) on the internet has been described in the additional information, it is possible to access to a homepage or the like on the internet displayed by the other URL in the music server 50.

Further, by communicating the data between the internet server 60 and server 50, the music data in the CD 55 loaded into the server 50 through the CD inserting portion 54 can be recorded into the storing medium of the music server 50 at a speed higher than the specified standard reproducing speed of the CD 55, for example, the music data of one CD 55 can be recorded for about two minutes. When a communication is not performed between the internet server 60 and server 50, the music data is recorded to the storing medium of the server 50 at the same speed as the specified standard reproducing speed of the CD 55, namely, at the one-time speed.

By connecting to the portable recording and reproducing apparatus 70 by the connection line 71, the server 50 can transfer and move the music data stored in the music server 50 to the portable reproducing apparatus 70. The moved music data can be reproduced by the portable recording and reproducing apparatus 70 and can be listened by, for example, headphones 72 even if the server 50 and apparatus 70 are not connected by the connection line 71. The transferred and moved music data is set into a state where it cannot be reproduced in the music server 50.

Figure 2:
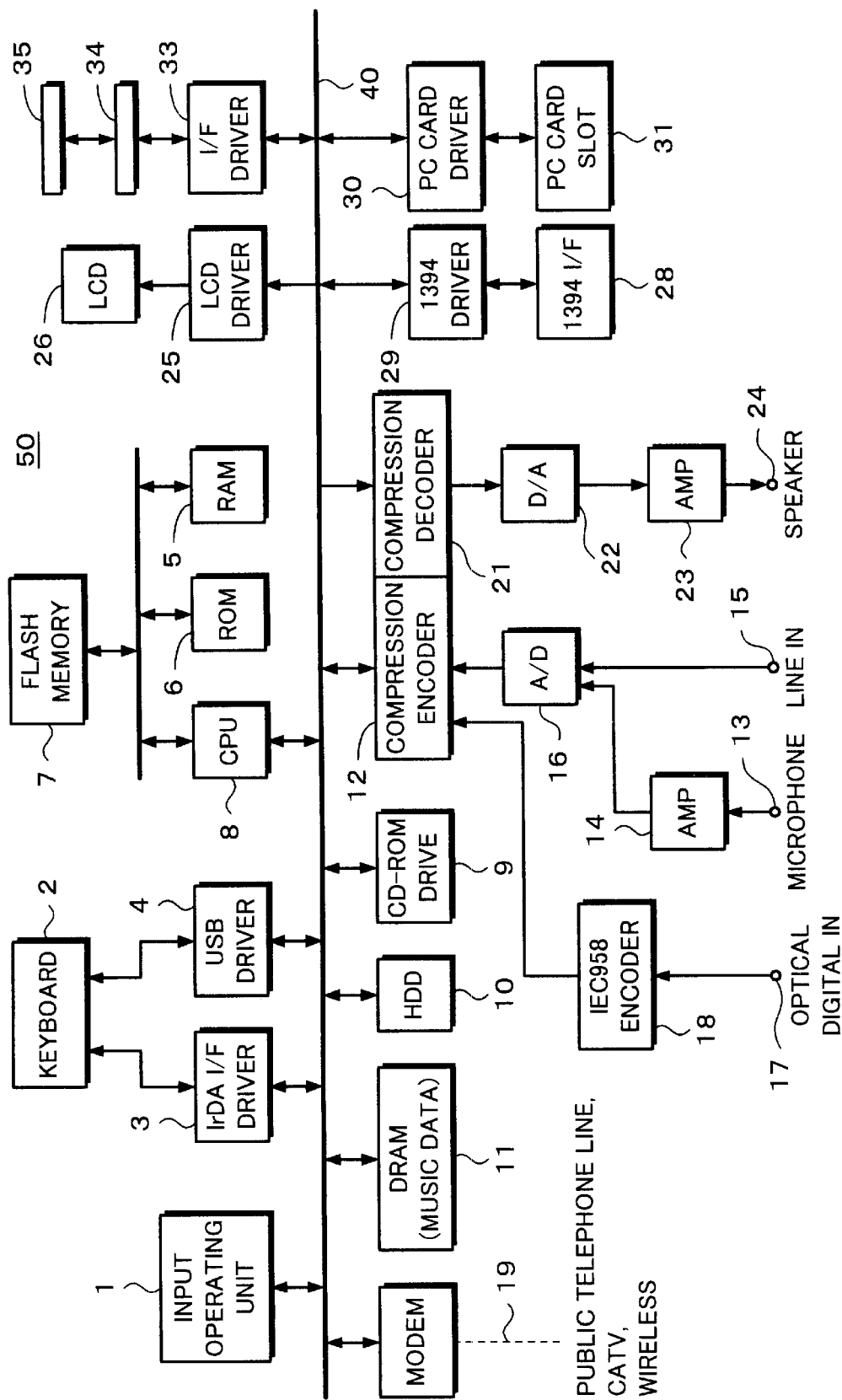
FIG. 2 is a block diagram showing an example of a construction of the music server.

FIG. 2 shows an example of a construction of the music server 50. First, in the music server 50, in a manner similar to the construction of the ordinary personal computer, an RAM 5, an ROM 6, a flash memory 7, and a CPU 8 which are mutually connected by a bus are provided. The CPU 8 is connected to a bus 40. The CPU 8 is constructed by a microcomputer or the like and functions as a controller and the whole operation of the music server 50 is controlled.

A program to control the operation of the music server 50 has previously been stored in the ROM 6. In the music server 50, on the basis of this program, the CPU 8 allows the operation corresponding to the operation of an input operating unit 1, which will be explained hereinafter, to be executed. A data area and a task area which are used when the program is executed are temporarily assured in the RAM 5 and flash memory 7. A program loader has been stored in the ROM 6 and the program itself can be also loaded into the flash memory 7 by the program loader of the ROM 6.

The input operating unit 1 comprises, for example, a plurality of push type and rotary type operation keys, switches which are operated by these operation keys, and the like. The input operating unit 1 is not limited to this type but an operation key of a rotary push type called a jog dial, a touch panel on the LCD, or the like can be also used. A switching mechanism which responds by pressing can be also used. A signal according to the operation of the input operating unit 1 is supplied to the CPU 8 through the bus 40. In the CPU 8, a control signal to control the operation of the music server 50 is formed on the basis of the signal from the input operating unit 1. The music server 50 is operated in response to the control signal formed by the CPU 8.

An infrared interface (IrDA I/F) driver 3 and/or a USB (Universal Serial Bus) driver 4 is connected to the bus 40. A keyboard 2 can communicate or connect to the drivers 3 and 4. By using the keyboard 2, for instance, the name of a music piece corresponding to the music data which is recorded, the name of artist, and the like can be easily inputted. The data can be also transferred through the infrared interface 3 or USB driver 4. The infrared interface driver 3 and USB driver 4 can be also omitted. A CD-ROM drive 9 is connected to the bus 40. The CD 55 inserted from the CD inserting portion 54 as mentioned above is loaded into the CD-ROM drive 9. In the CD-ROM drive 9, the music data is read out from the loaded CD 55 at the specified standard reproducing speed. In the CD-ROM drive 9, the music data of the CD 55 can be read out at a speed which is higher than the specified standard reproducing speed, for instance, which is 16 or 32 times as high as the specified standard reproducing speed.

The CD-ROM drive 9 is not limited to the foregoing example but can be also made correspond to another disk-like recording medium in which music data has been stored, for example, a magnetooptical disc or a DVD (Digital Versatile Disc; trade name). A drive corresponding to a memory card can be also used. Further, the data which is read out from the CD-ROM drive 9 is not limited to the music data but image data, text data, program data, or the like can be also read out.

A hard disk drive (hereinafter, abbreviated as an HDD) 10 is connected to the bus 40. The music data read out from the CD-ROM drive 9 is recorded to the HDD 10. As a preprocess of the process for recording the music data to the HDD 10, the music data read out by the CD-ROM drive 9 is supplied to a compression encoder 12 through the bus 40 and a DRAM 11 for audio.

In the compression encoder 12, a compression encoding process of the music data is performed by the foregoing compressing method disclosed in, for example, U.S. Pat. No. 5,717,821 or the like. As a compressing speed of the music data by the compression encoder 12, two speeds of a low speed and a high speed are prepared on the basis of the control of the CPU 8. The low speed compressing speed corresponds to the standard reproducing speed specified for the CD 55 in the CD-ROM drive 9. The compressing speed is switched in accordance with, for example, the reproducing speed of the CD 55 by the CD-ROM drive 9. In the compression encoder 12, for example, an encoding algorithm according to the compressing speed is driven.

The changing method of the compressing speed in the compression encoder 12 is not limited to the foregoing method. For instance, it can be also changed by switching a clock frequency of the compression encoder 12. A different hardware can be also prepared. Further, in the compression encoder 12 in which the high speed compression can be performed, it is also possible to correspond to the low compressing speed by thinning out the processes.

The compression music data which was compression encoded by the compression encoder 12 is recorded and accumulated to the HDD 10 through the DRAM 11.

Although it is constructed such that the compression music data which was compression encoded by the compression encoder 12 is accumulated to the HDD 10, the music data which is read out from the CD-ROM drive 9 can be also directly supplied to the HDD 10 and can be recorded and accumulated to the hard disk of the HDD 10.

In the example, an audio signal which is inputted through an amplifier 14 from a microphone connected to a terminal 13 and an audio signal which is inputted from a line input terminal 15 are supplied to the compression encoder 12 through an A/D converter 16. Those audio signals outputted from the A/D converter 16 can be compression encoded by the encoder 12 and can be supplied and recorded to the HDD 10. Further, an optical digital signal is supplied from an optical digital input terminal 17 to the compression encoder 12 through an IEC 958 (International Electrotechnical Commission 958) encoder 18. The audio signal supplied as an optical digital signal can be compression encoded by the encoder 12 and can be recorded to the HDD 10.

Although the case where the compression encoder 12 uses an encoding algorithm as disclosed in, for example, U.S. Pat. No. 5,717,821 has been shown in the above embodiment, the invention is not limited to the foregoing example. That is, in the compression encoder 12, any other algorithm can be also used so long as it is an encoding algorithm by which information is compressed. For example, the compression encoder 12 can also use an encoding algorithm such as MPEG (moving picture coding experts group), PASC (precision adaptive sub-band coding), TwinVQ (trade name), RealAudio (trade name), or LiquidAudio (trade name).

A modem 20 is connected to the bus 40. For example, an external network 19 such as public telephone line, CATV, or wireless communication is connected to the modem 20. The music server 50 can communicate through the external network 19 by the modem 20.

The music server 50 is connected to, for example, the internet through the external network 19. A communication is executed between the music server 50 and the remote internet server 60. A request signal and various information such as media information as information regarding the CD 55 loaded in the CD-ROM drive 9, user ID data and user information which have previously been given to the music server 50, accounting information to the user, and the like are transmitted and sent from the music server 50 to the internet server 60.

The various information such as media information, user information, and the like is transmitted to the internet server 60. On the basis of the received user information such as user ID data and the like, the server 60 executes the authentication of the user, the collating process, and the accounting process. On the basis of the received media information, the additional information of the music data is retrieved and transmitted from the server 60 to the music server 50.

Although the example in which the additional information of the music data is returned has been shown here, the music data can be also directly supplied from the external network 19 on the basis of a request by the user. That is, the user can download the music data from the internet server 60 by using the music server 50. The music data can be also returned in correspondence to the media information. Thus, for example, a bonus track of a predetermined CD 55 can be obtained by the transmission.

When the compression music data which has been compression encoded by the compression encoder 12 and recorded and accumulated in the HDD 10 is read out for reproduction from the HDD 10, it is supplied to a compression decoder 21 through the bus 40. The compression encoding of the compression music data read out from the hard disk of the HDD 10 is released by the compression decoder 21 and the resultant data is outputted to a terminal 24 through a D/A converter 22 and an amplifier 23. The data is supplied from the terminal 24 to the speaker units 52L and 52R and the music is reproduced. Although not shown in FIG. 2, as a path starting from the D/A converter 22 and reaching the terminal 24 through the amplifier 23, two paths are provided in correspondence to stereophonic outputs. Similarly, two terminals 24 are also provided in correspondence to the stereophonic sound.

In the compression decoder 21, a decoding algorithm corresponding to the encoding algorithm in the compression encoder 12 is used. The compression decoder 21 and foregoing compression encoder 12 can be also realized as software processes by the CPU 8 without having hardware. A liquid crystal display device (hereinafter, simply referred to as an LCD) 26 constructing the display unit 53 is connected to the bus 40 through an LCD driving circuit (namely, LCD driver) 25. A drawing control signal is supplied from the CPU 8 to the LCD driving circuit 25 through the bus 40. On the basis of the supplied drawing control signal, the LCD 26 is driven by the LCD driving circuit 25 and a predetermined display is performed to the display unit 53, namely, the LCD 26.

An operation menu of the music server 50, for example, is displayed on the LCD 26. For instance, a title list of the compression music data recorded and accumulated in the HDD 10 is displayed on the LCD 26. As for the title list which is displayed on the LCD 26, since the data based on the data obtained by decoding the additional information transmitted from the internet server 60 has been supplied to the HDD 10, the display is performed on the basis of the data stored on the HDD 10. For example, a folder or a jacket image corresponding to the compression music data which is selected and reproduced is further displayed on the LCD 26 on the basis of the additional information transmitted from the internet server 60.

By operating a pointing device of the input operating unit 1 or the keyboard 2 on the basis of the display on the LCD 26, the CPU 8 performs the reproduction control of the instructed music data. The erasure of the selected music data or the control of the copy or move of the selected music data to the external apparatus can be also performed on the basis of the display of the LCD 26. For example, when the input operating unit 1 is a touch panel provided on the LCD 26, by touching the touch panel in accordance with the display of the LCD 26, the operation of the music server 50 can be performed. As mentioned above, the music data recorded and accumulated in the HDD 10 is managed and controlled by the user by using the LCD 26 as an interface.

In the first embodiment, the invention corresponds to the IEEE 1394 and uses a PC card as an interface between the music server 50 and the external general information apparatus. An IEEE 1394 interface 28 is connected to the bus 40 through an IEEE 1394 driver 29. Similarly, a PC card slot 31 is connected to the bus 40 through a PC card driver 30.

Transmission and reception of data can be performed between the music server 50 and, for example, a personal computer by the IEEE 1394 interface 28. Music data can be fetched from an IRD (Integrated Receiver/Decoder) for satellite broadcasting, a small magnetooptical disc or optical disc having a diameter of about 64 mm, a DVD (Digital Versatile Disc: trade name), a digital video tape, or the like by the IEEE 1394 interface 28. By loading the PC card into the PC card slot 31, an expansion of an external storage device or another media drive or various peripheral devices such as modem, terminal adapter, capture board, and the like can be easily performed.

An interface 34 is an interface to transmit and receive music data or the like between the music server 50 and a corresponding other recording and reproducing apparatus. For example, the portable recording and reproducing apparatus 70 shown in FIG. 1 mentioned above is applied to the other recording and reproducing apparatus. The invention is not limited to it but another music server 50 can be also used as another recording and reproducing apparatus.

The interface 34 is connected to the bus 40 through an interface driver 33. An interface 35 constructing a pair together with the interface 34 is provided for the corresponding other recording and reproducing apparatus. By electrically connecting the interfaces 34 and 35 by the predetermined connection line 71, for instance, the music data recorded and accumulated in the HDD 10 can be transferred from the music server 50 to the other recording and reproducing apparatus.

Figure 3:
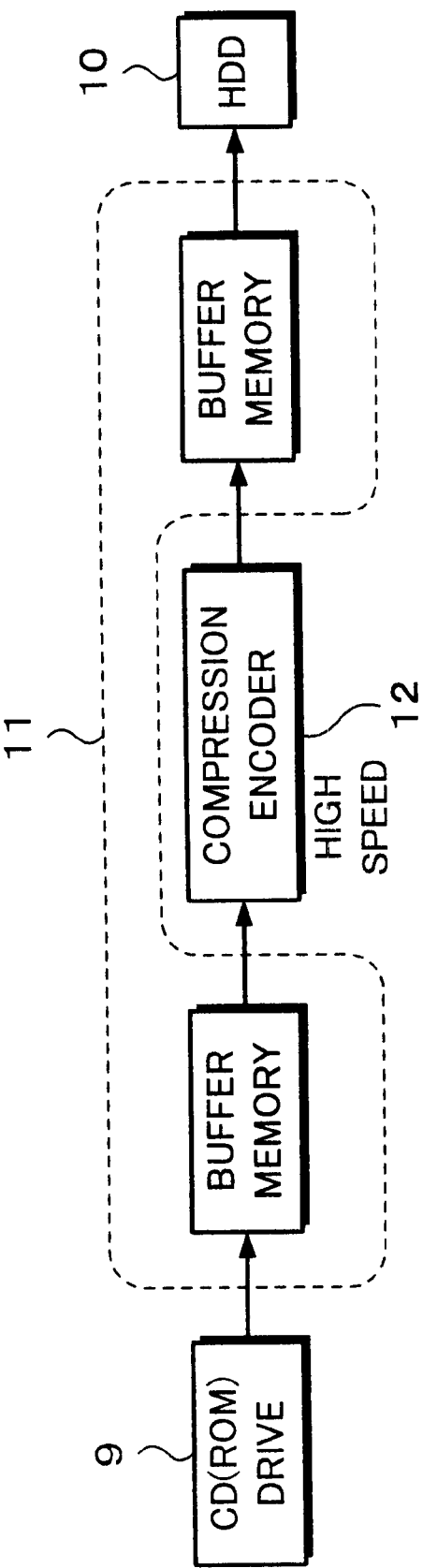
FIG. 3 is a diagram schematically showing a signal flow until music data read out by a CD-ROM drive is recorded to a hard disk drive.

FIG. 3 schematically shows a signal flow until the music data read out by the CD-ROM drive 9 is recorded into the HDD 10. The music data read out from the CD-ROM drive 9 is once stored into the DRAM 11 as a buffer memory through the bus 40. The music data is read out from the DRAM 11 at a predetermined timing and is supplied to the compression encoder 12 through the bus 40. The compression encoder 12 is set to a predetermined compressing speed according to the reproducing speed of the CD-ROM drive 9 as mentioned above. The music data is compression encoded by the compression encoder 12 and is again once stored into the DRAM 11 as a buffer memory. The compression music data read out from the DRAM 11 at a predetermined timing is supplied to the HDD 10 through the bus 40 and is recorded to the hard disk of the HDD 10. In this instance, the TOC information of the CD 55 which is reproduced by the CD-ROM drive 9 is transmitted to the internet server 60 as mentioned above and the additional information of the CD 55 transmitted from the server 60 is also recorded to the hard disk of the HDD 10 and is managed as one data by the CPU 8 or the like together with the compression music data based on the music data read out from the CD 55.

Figure 4:
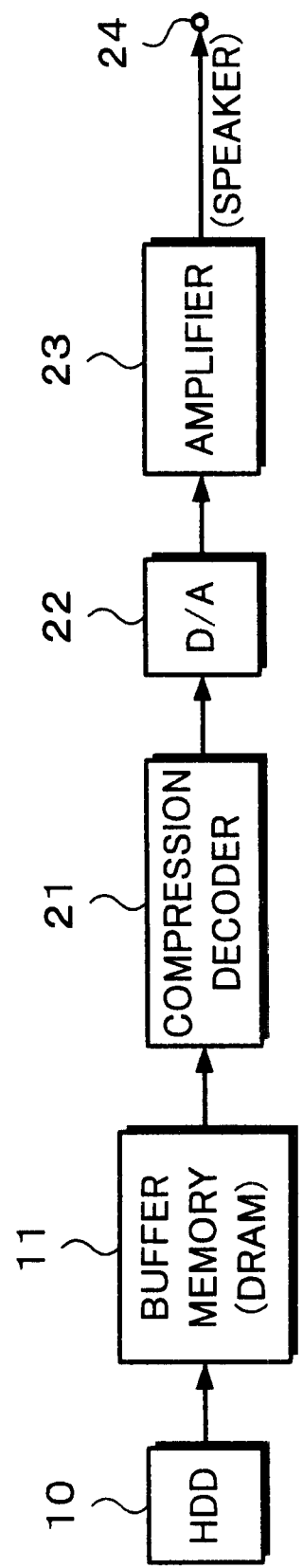
FIG. 4 is a diagram schematically showing a signal flow until compression music data read out by a hard disk drive is reproduction processed and is outputted to a terminal.

FIG. 4 schematically shows a signal flow until the compression music data read out from the HDD 10 is reproduction processed and is supplied to the terminal 24. The compression music data read out from the HDD 10 is once stored into the DRAM 11 as a buffer memory through the bus 40. The compression music data is read out from the DRAM 11 at a predetermined timing and is supplied to the compression decoder 21 through the bus 40. The compression music data is decompressed by the compression decoder 21, the compression encoding is released, and the resultant data is supplied as music data to the D/A converter 22. The music data is converted into an analog audio signal by the D/A converter 22 and is amplified by the amplifier 23. An amplified signal is supplied as a reproduction output to the terminal 24. If the speakers are connected to the terminal 24, the music reproduced by the speakers can be enjoyed. In this instance, the additional information read out from the disc of the HDD 10 is decoded as necessary by the CPU 8 or the like and the music piece titles or the like are displayed on the display unit 53.

Figure 5:
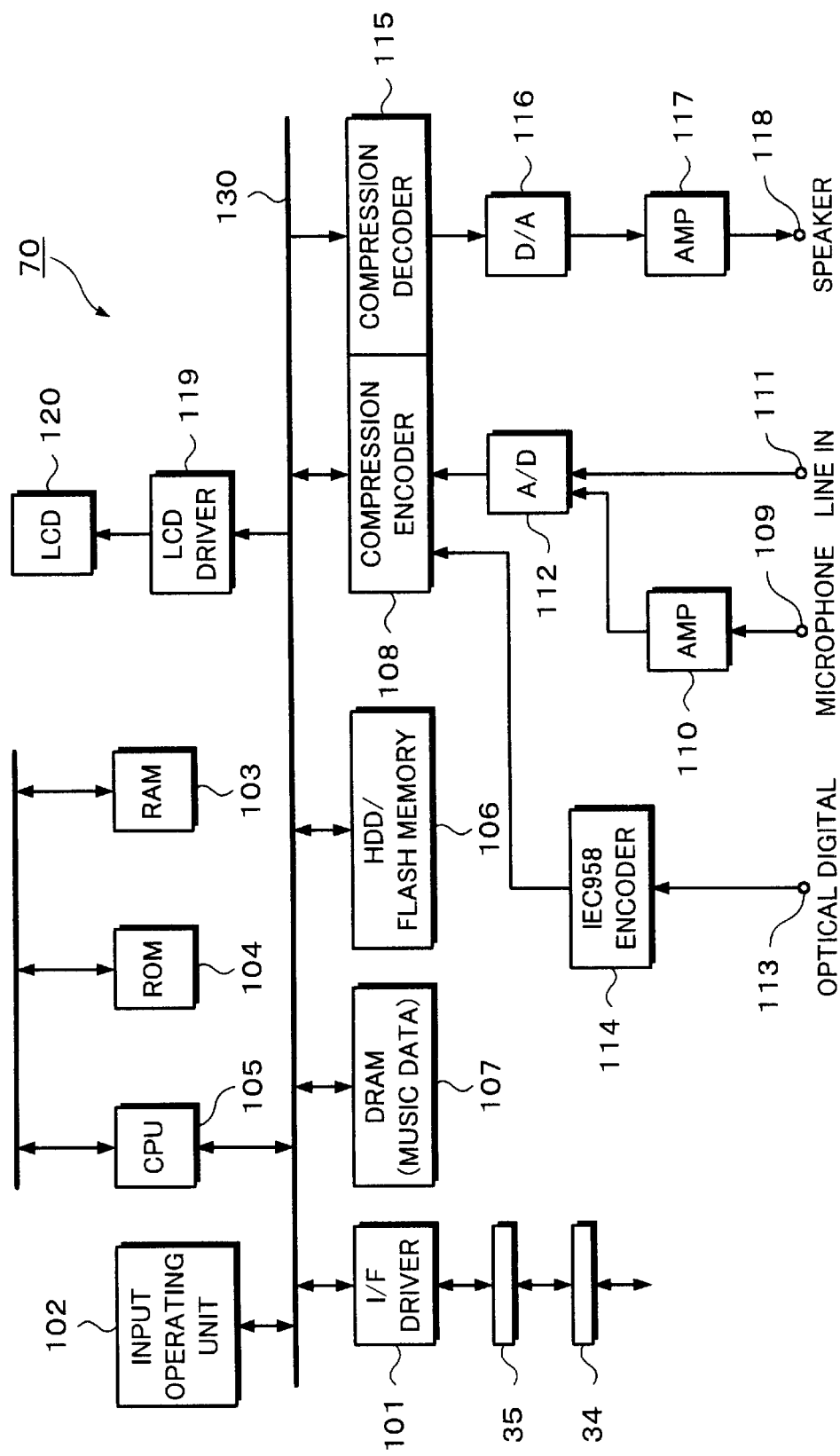
FIG. 5 is a block diagram showing an example of a construction of a portable recording and reproducing apparatus.

FIG. 5 shows an example of a construction of the portable recording and reproducing apparatus 70 which is used as another recording and reproducing apparatus. The portable recording and reproducing apparatus 70 has a construction similar to the music server 50 shown in FIG. 2 mentioned above. As for the portable recording and reproducing apparatus 70, the interface 34 on the music server 50 side and the interface 35 on the portable recording and reproducing apparatus 70 side are usually separated and are carried and used as sole units. First, in the portable recording and reproducing apparatus 70, in a manner similar to the construction of the ordinary personal computer, a RAM 103, a ROM 104, and a CPU 105 which are mutually connected by a bus are provided. A flash memory can be also provided in a manner similar to the construction of the music server 50. The CPU 105 constructed by a microcomputer or the like is connected to a bus 130. The CPU 105 functions as a controller and the whole operation of the portable recording and reproducing apparatus 70 is controlled by the CPU 105.

A program to control the operation of the portable recording and reproducing apparatus 70 has previously been stored in the ROM 104. In the portable recording and reproducing apparatus 70, the operation corresponding to the operation of the input operating unit 102, which will be explained hereinbelow, is executed on the basis of such a program. A data area and a task area which are used when the program is executed are temporarily assured in the RAM 103.

The input operating unit 102 comprises, for example, a plurality of push type and rotary type operation keys and a plurality of switches which are operated by those operation keys. The input operating unit 102 is not limited to such a type but a rotary push type operation key called a jog dial, a touch panel on the LCD provided for the apparatus 70, which will be explained hereinafter, or the like can be also used. A mechanical switching mechanism which responds by depressing can be also used. A signal corresponding to the operation of the input operating unit 102 is supplied to the CPU 105 through the bus 130. The CPU 105 forms a control signal to control the operation of the portable recording and reproducing apparatus 70 on the basis of an output signal which is generated by operating the operation keys of the input operating unit 102. The operation of the portable recording and reproducing apparatus 70 is switched and the operation is controlled in response to the control signal formed by the CPU 105.

In the music server 50, the music data which was read out from the HDD 10 and in which a transfer to the portable recording and reproducing apparatus 70 has been instructed is transferred or supplied to the portable recording and reproducing apparatus 70 through the interfaces 34 and 35 and a connection line connecting the interfaces 34 and 35. At the same time, the additional information of the music data whose transfer has been instructed is also transmitted to the apparatus 70 together with the music data whose transfer has been instructed. In the case where mutually corresponding attaching units are respectively provided for the music server 50 and portable recording and reproducing apparatus 70, the interfaces 34 and 35 are directly connected and the music data is transferred between the server 50 and apparatus 70. Further, in the case where the interface by IrDA is provided for both of the apparatus 70 and server 50, the music data is transferred between the server 50 and apparatus 70 by an infrared signal.

The music data transferred and supplied from the server 50 to the apparatus 70 is supplied from an interface driver 101 to an HDD 106 as a music data recording medium of the portable recording and reproducing apparatus 70 through the bus 130 and is recorded to the hard disk of the HDD 106.

The music data recording medium of the portable recording and reproducing apparatus 70 is not limited to the HDD 106 but, for example, a flash memory can be also used. Any other recording medium such as a magnetooptical disc can be also used as a music data recording medium so long as it can follow the reproducing speed of the music data. As a music data recording medium of the apparatus 70, for instance, tens of music pieces can be recorded by using a medium having a memory capacity of about 200 MBytes. The music data transmitted from the server 50 and the additional information of the music data are also recorded to the disc of the HDD 106 of the apparatus 70.

In the example, the music data which is transferred and recorded to the HDD 106 is the compression music data which has already been compression encoded in the music server 50. In the portable recording and reproducing apparatus 70, the invention is not limited to such an example but music data which is not compression encoded is supplied and can be also recorded to the hard disk of the HDD 106. For example, the music data reproduced and read out from the CD 55 loaded in the CD-ROM drive 9 of the music server 50 is directly supplied to the portable recording and reproducing apparatus 70 through the interface driver 101. In case of directly supplying the data to the apparatus 70, however, it will be obviously understood that the number of recordable music data is largely limited.

As a pre-process of the process for recording the music data to the hard disk of the HDD 106, the supplied music data is temporarily stored into a DRAM 107 for audio which is connected to the bus 130. The music data read out from the DRAM 107 is supplied to a compression encoder 108 through the bus 130. The compression encoder 108 executes a compression encoding process of the music data by an encoding algorithm similar to that of the compression encoder 12 in the music server 50. The compression music data which was compression encoded by the compression encoder 108 is supplied to the DRAM 107 and is again temporarily stored into the DRAM 107. Finally, the compression music data stored in the DRAM 107 is read out and recorded to the hard disk of the HDD 106.

As mentioned above, when the move of the compression music data accumulated in the HDD 10 is instructed and the data is transmitted and transferred to the portable recording and reproducing apparatus 70 in the music server 50, although the compression music data of the HDD 10 exists as data on the HDD 10, it is set into a state where it cannot be read out from the HDD 10 and reproduced. The compression music data moved to the apparatus 70 is again returned to the recording medium on the moving source side, namely, to the HDD 10 of the server 50, so that music data can be read out from the HDD 10 and reproduced by the moving source side, namely, server 50. In this instance, the compression music data returned to the server 50 is deleted from the hard disk of the HDD 106 of the apparatus 70 serving as a recording medium on the move destination side.

In this example, an audio signal which is inputted through an amplifier 110 from a microphone connected to the terminal 109 and an audio signal which is inputted from a line input terminal 111 are supplied to the compression encoder 108 through an A/D converter 112. The compression encoding process can be performed to the audio signals supplied from the A/D converter 112 by the compression encoder 108 and the compression encoded signal can be recorded to the HDD 106. Further, an optical digital signal is supplied from an optical digital input terminal 113 to the compression encoder 108 through an IEC 958 encoder 114. The audio signal supplied as an optical digital signal can be subjected to the compression encoding process by the encoder 108 and can be recorded to the hard disk of the HDD 106. So long as the apparatus 70 is a read only portable reproducing apparatus only for reproducing the compressed music data, all of the foregoing A/D converter 112, encoder 108, and the like can be also omitted.

The compression music data is read out from the HDD 106 for reproduction and is supplied to a compression decoder 115 through the bus 130. The music data in which the decompressing process has been performed to the supplied compression music data and the compression encoding has been released by the compression decoder 115 is outputted to a terminal 118 through a D/A converter 116 and an amplifier 117. For example, the headphones 72 are connected to the terminal 118. The user can listen to the reproduced music by attaching the headphones 72. Although not shown in FIG. 5, as a signal path starting from the D/A converter 116 and reaching the terminal 118 through the amplifier 117, two paths are provided in correspondence to the stereophonic outputs in the L-channel and the R-channel. Similarly, two terminals 118 are also provided in correspondence to the stereophonic sounds of the L channel and the R channel.

An LCD 120 is connected to the bus 130 through an LCD driving circuit 119. A drawing control signal is supplied from the CPU 105 to the LCD driving circuit 119 through the bus 130, the LCD 120 is driven on the basis of the supplied drawing control signal, and a predetermined display is performed to the LCD 120. An operation menu of the portable recording and reproducing apparatus 70, a title list of the music data stored on the HDD 106, or the like is displayed on the LCD 120. For example, a folder or a jacket image corresponding to the music data which is selected and reproduced from the music data stored in the HDD 106 can be also displayed on the LCD 120 on the basis of the additional information stored on the HDD 106.

By operating the pointing device of the input operating unit 102 by the user on the basis of the display of the LCD 120, one compression music data in the compression music data stored on the HDD 106 is selected and reproduced. The control of the erasure, copy, and move of the selected compression music data can be also performed on the basis of the display of the LCD 120. For example, by touching the touch panel of the input operating unit 102 by the user in accordance with the display of the LCD 120, the operation input of the portable recording and reproducing apparatus 70 can be performed. As mentioned above, the compression music data recorded on the HDD 106 is managed by the user while using the LCD 120 as an interface and the recording, reproduction, and the like are controlled.

Although not shown in FIG. 5, the portable recording and reproducing apparatus 70 is driven by a battery. For this purpose, a power supply unit using a general secondary battery or dry cell as a power supplying source is provided and a charging unit is provided for the apparatus 70. In the case where the music server 50 and portable recording and reproducing apparatus 70 are directly connected by a connection line or attaching units, the music data is transferred and an electric power is supplied from the music server 50 to the charging unit and the secondary battery of the apparatus 70 is charged. The secondary battery of the apparatus 70 can be also charged by an external charging power source. As a power supplying source, either one of the power source by a dry cell and the charging power source using the secondary battery can be also used or provided for the apparatus 70.

Figure 6:
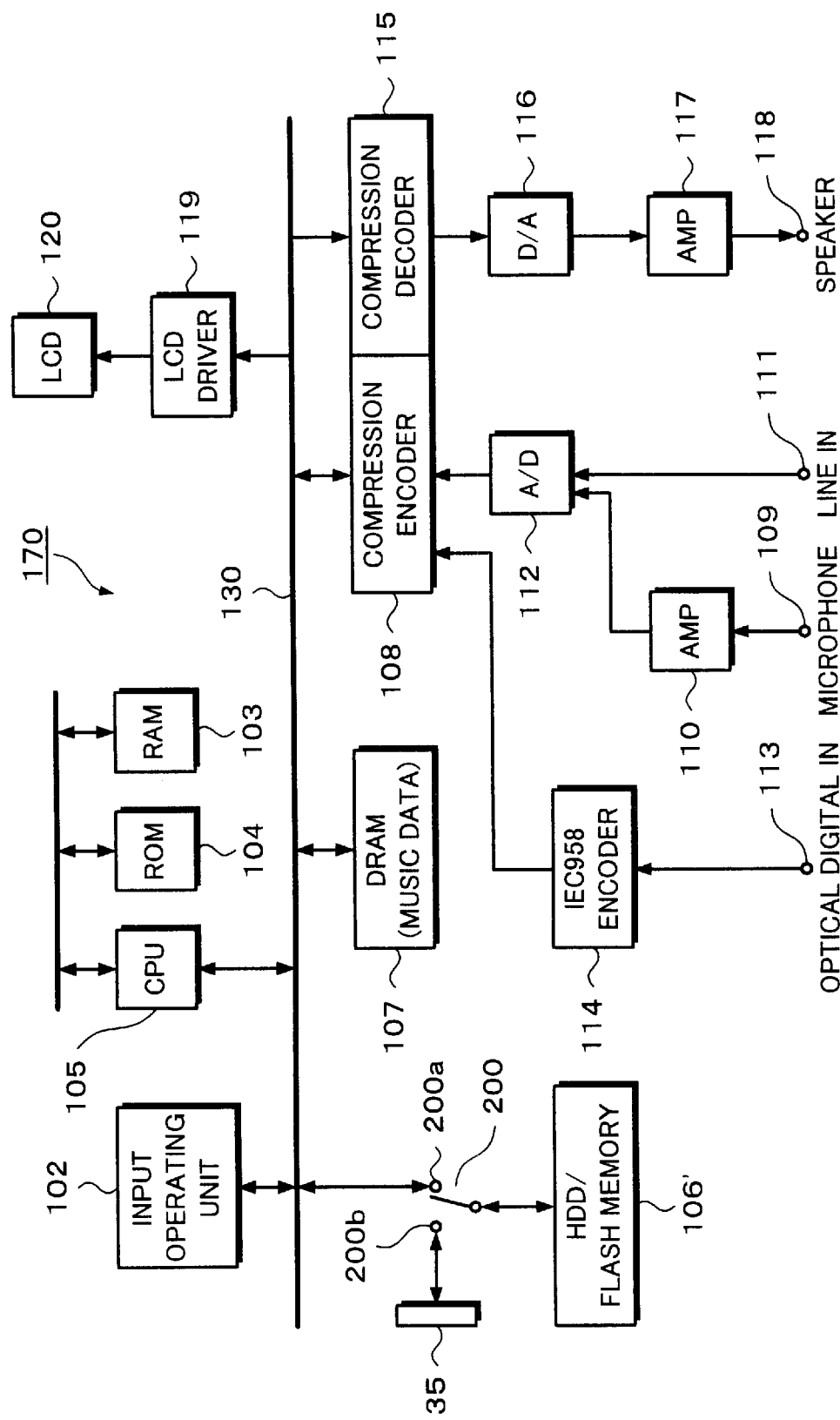
FIG. 6 is a block diagram showing another example of a portable recording and reproducing apparatus.

FIG. 6 shows another example of the foregoing portable recording and reproducing apparatus 70. In FIG. 6, portions common to those in FIG. 5 mentioned above are designated by the same reference numerals and their detailed description is omitted. In a portable recording and reproducing apparatus 170 shown in FIG. 6, for the construction of FIG. 5 mentioned above, a switching circuit 200 is inserted between an HDD (or flash memory) 106a and the bus 130. One selection terminal 200a of the switching circuit 200 is connected to the bus 130 and another selection terminal 200b is connected to the interface 35. The HDD 106a is separated from the bus 130 by the switching circuit 200.

When the compression music data is transferred from the music server 50, a terminal is switched to the selection terminal 200b or the selection terminal 200b is selected in the switching circuit 200. The HDD 106a and the bus 40 of the music server 50 are directly connected through the interfaces 34 and 35. The HDD 106a is seen as if it were a recording medium of the music server 50 when it is seen from the CPU 8 of the server 50. The direct control of the HDD 106a is enabled by the CPU 8 of the music server 50. The move, copy, or the like of the compression music data can be easily performed between the music server 50 and portable recording and reproducing apparatus 70.

Figure 7:
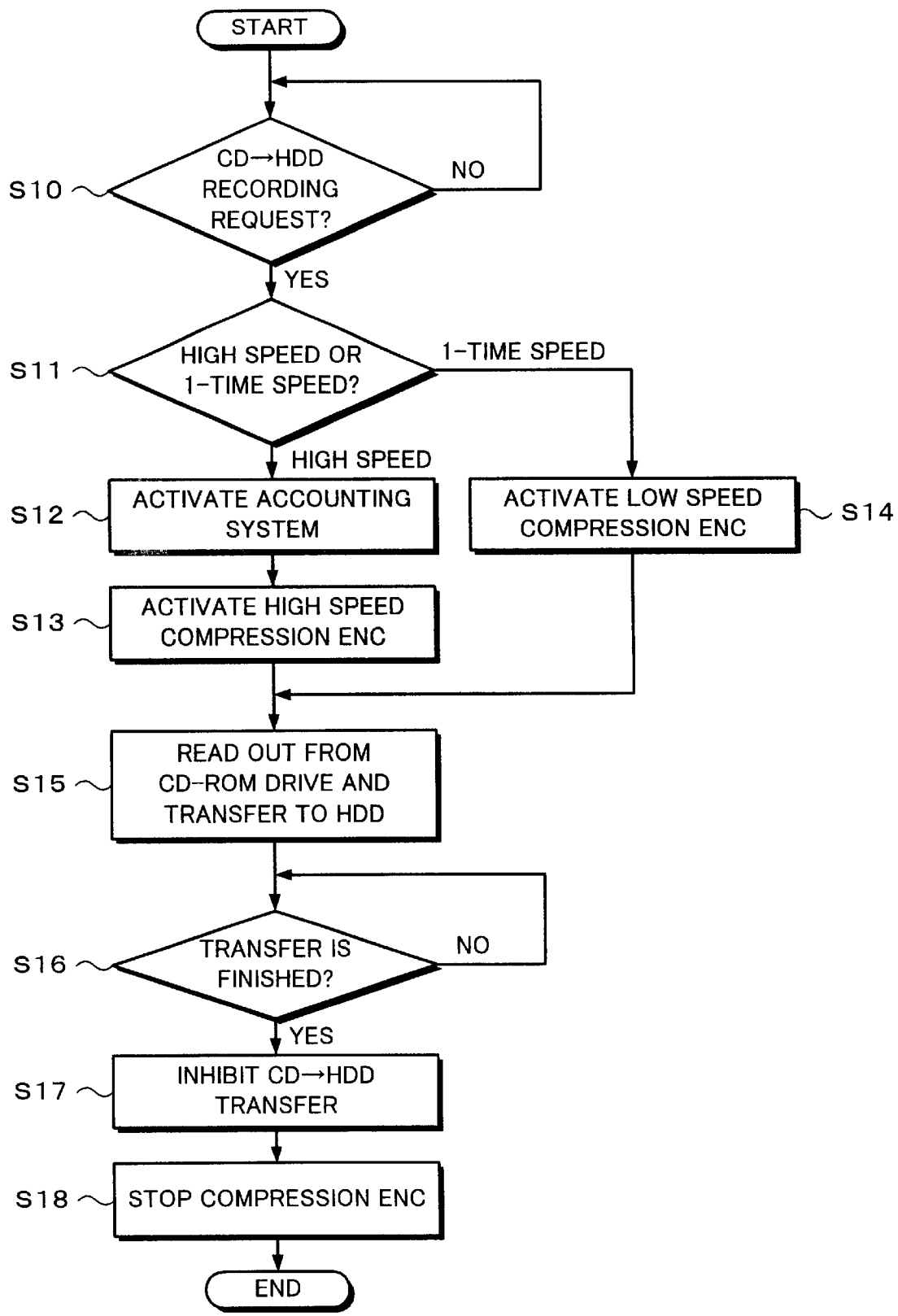
FIG. 7 is a flowchart of an example of processes when music data of a CD in the music server is recorded to a hard disk drive.

The operation of the system constructed as mentioned above will now be described. First, functions which are solely executed by the music server 50 will be explained. FIG. 7 is a flowchart of an example of processes when the music data of the CD 55 loaded in the CD-ROM drive 9 is recorded to the disc of the HDD 10 of the music server 50.

In first step S10, the apparatus waits for a recording request of the music data of the CD 55 to the HDD 10 by the user. For example, when the recording request is inputted by the user by using the input operating unit 1, the processing routine advances to step S11. In step S11, a check is made to see if the recording requested by the user is the "high speed recording" or the "recording at the one-time speed". For example, when the recording request is issued in step S10 mentioned above, a recording method, namely, a mode to record at a high speed or a mode to record at the one-time speed is designated by the user. The "recording at the one-time speed" used here denotes the operation for reading out the CD 55 at the specified standard speed and recording data to the disc of the HDD 10. The "high speed recording" used here denotes the operation to read out the CD 55 at a speed that is two or more times as high as the specified standard speed and to record data to the disc of the HDD 10.

If the execution of the "high speed recording" is designated in step S11, the processing routine advances to step S12 and an accounting system of the servers 50 and 60 is activated. Processes by the accounting system of the servers 50 and 60 will be explained hereinafter. When the accounting process by the accounting system of the server 50 is performed and the "high speed recording" is permitted from the internet server 60 or another apparatus, the processing routine advances to step S13 and a high speed compressing process is activated in the compression encoder 12. The processing routine advances to step S15.

When the execution of the "recording at the one-time speed" is designated in step S11, the processing routine advances to step S14 and a low speed compressing process is activated in the compression encoder 12. The processing routine advances to step S15. In step S15, the CD-ROM drive 9 is driven at a predetermined speed on the basis of the control of the CPU 8 and the music data recorded in the CD 55 loaded in the CD-ROM drive 9 is read out. The read-out music data is compression encoded by the compression encoder 12 and is transferred to the disk of the HDD 10 and recorded.

In step S16, when it is determined that the transfer of the compression music data read out from the CD 55 to the HDD 10 has been finished, the transfer of the data from the CD-ROM drive 9 to the HDD 10 is inhibited in next step S17. The compressing process of the compression encoder 12 is stopped in further next step S18.

Figure 8A:
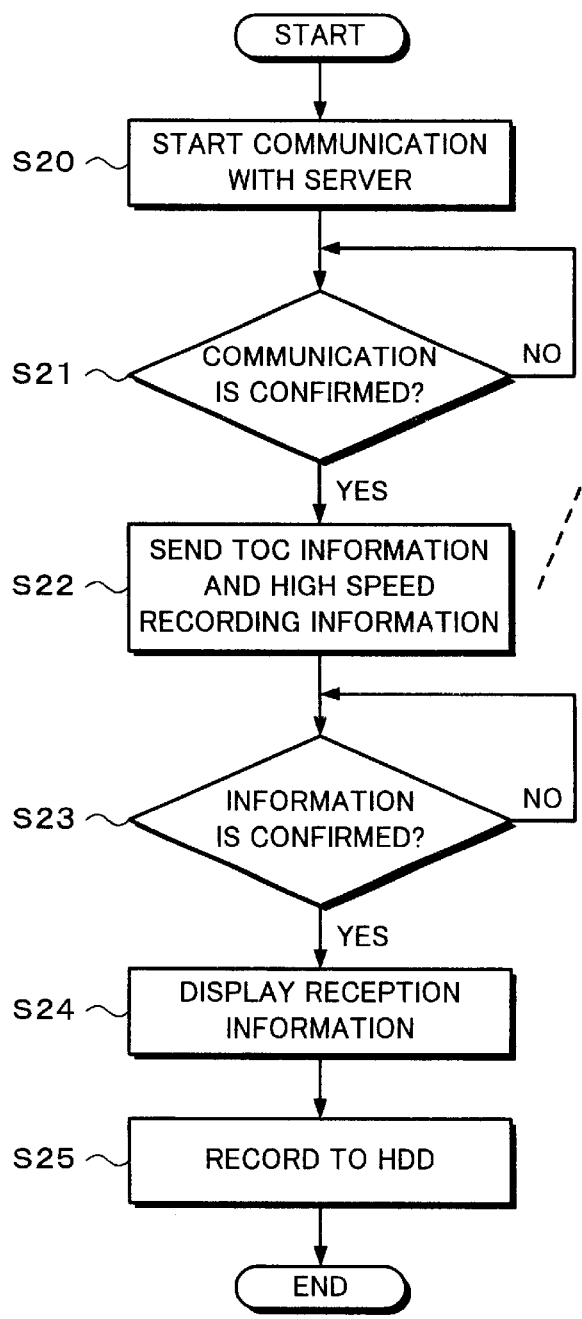
FIGS. 8A and 8B are flowcharts showing an example of an accounting process when music data of a CD is recorded to a hard disk drive at a high speed.
Figure 8B:
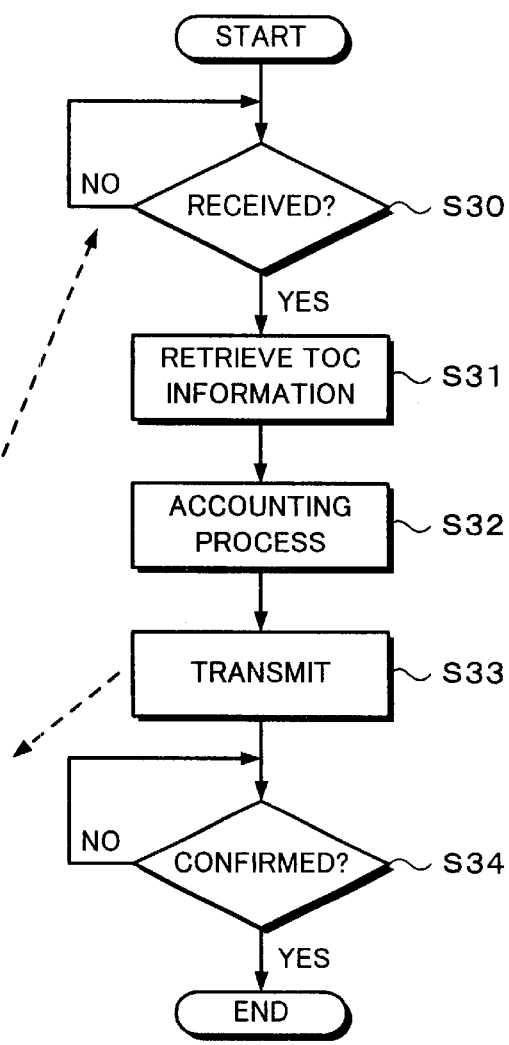

FIGS. 8A and 8B are flowcharts showing an example of the accounting process of the accounting system in step S12 of the foregoing flowchart of FIG. 7. The accounting process is performed by performing a data communication between the music server 50 and internet server 60. FIG. 8A shows an accounting process in the account processing system in the music server 50 and FIG. 8B shows an accounting process in the account processing system in the internet server 60.

When the accounting process is started, in step S20 in FIG. 8A, the communication is first started between the music server 50 and internet server 60 by a predetermined protocol. In step S21, when the connection between the server 50 and server 60 is established and a state where the communication between the server 50 and server 60 is possible is confirmed, the processing routine advances to step S22.

In step S22, the TOC information of the CD 55 which is loaded in the CD-ROM drive 9 and is transferred and recorded to the HDD 10 is sent from the music server 50 to the internet server 60. High speed recording information showing the execution of the "high speed recording" is transmitted from the music server 50 to the internet server 60 together with the TOC information of the CD 55.

In FIG. 8B, on the other hand, in the internet server 60, the apparatus waits until the high speed recording information and TOC information are supplied or transmitted from the music server 50 (step S30). When the high speed recording information and the TOC information are received by the server 60, the TOC information transmitted is retrieved in step S31 by using the database in the server 60 or an external database on the basis of the transmitted TOC information. By retrieving the information corresponding to the TOC information, the CD 55 is specified.

The accounting process is performed in next step S32. A money amount to be accounted is calculated on the basis of the information such as the number of music pieces which were subjected to the "high speed recording" and, for example, the accounting can be performed by drawing money from an account of the bank designated by the user on the basis of the credit card number of the user which has previously been registered. The accounting method is not limited to this method. For instance, there is also considered a method whereby a function to read a prepaid card is provided for the music server 50, a set account money amount is sent to the music server 50, and the user pays the account money amount by allowing the accounted money amount to be subtracted from the prepaid card. On the basis of the TOC information, the account money amount can be changed or the recording to the disc of the HDD 10 of the music data read out from the CD 55 can be also inhibited in accordance with the contents of the CD 55.

In step S33, the accounting information is transmitted to the music server 50. In FIG. 8A, the contents of the transmitted accounting information is confirmed on the music server 50 side (step S23). On the internet server 60 side as well, a check is made to see if the accounting information has been received by the music server 50 (step S34). For instance, this checking operation is performed by transmitting data indicative of the completion of the confirmation from the music server 50 to the server 60 when it is confirmed that there is no error in the accounting information received on the music server 50 side and the accounting information has correctly been received.

Returning to FIG. 8A, when the accounting information received on the music server 50 side is confirmed in step S23, the processing routine advances to step S24 and the received accounting information or the like is displayed on the display unit 53. In step S25, the music data is read out from the CD 55 at a speed higher than the specified normal speed by the CD-ROM drive 9. The compressing process is executed at a high compressing speed by the compression encoder 12. The compression music data from the compression encoder 12 is supplied to the HDD 10 and recorded to the disk of the HDD 10. Step S25 corresponds to step S15 in FIG. 7 mentioned above.

Figure 9:
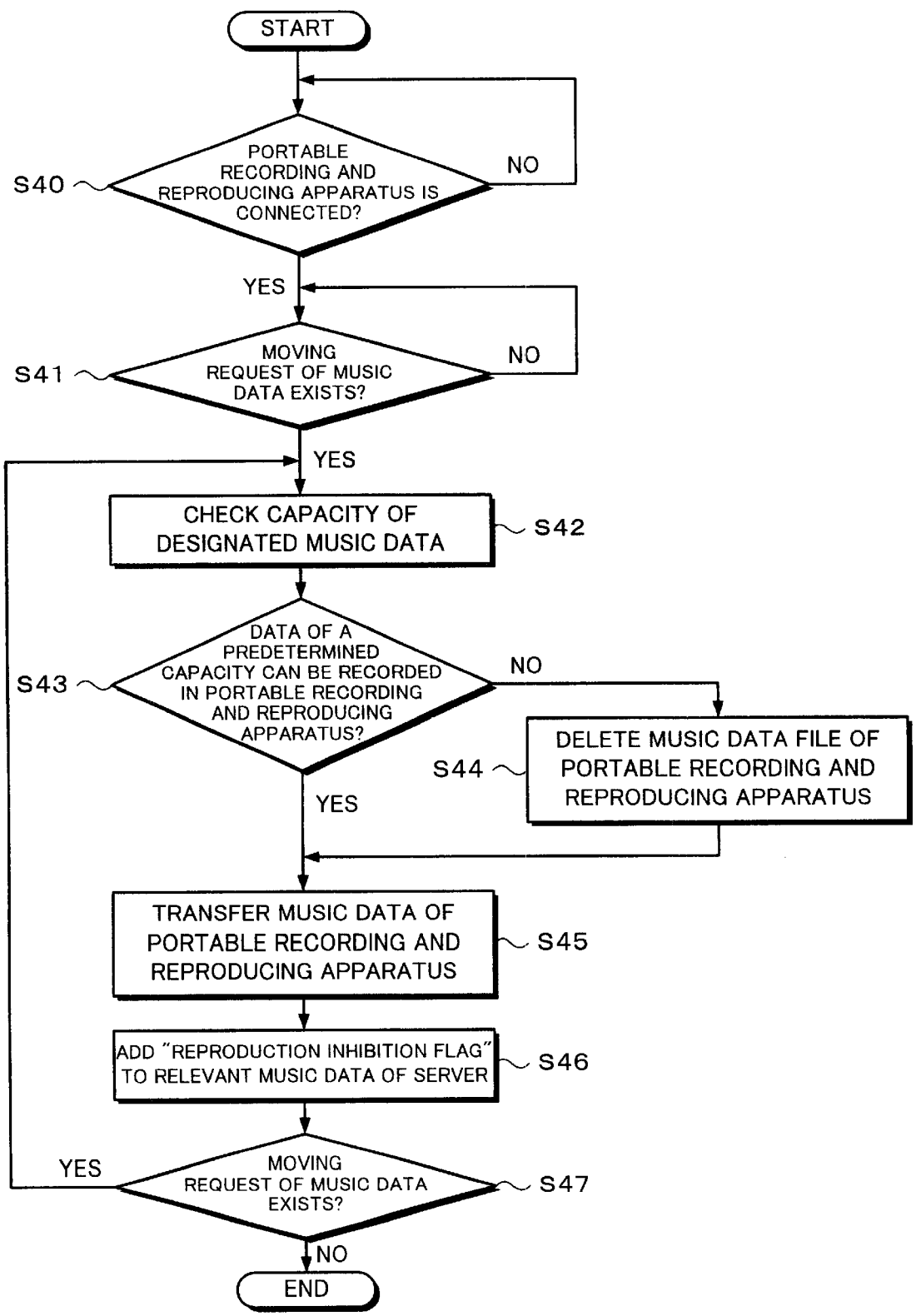
FIG. 9 is a flowchart of an example of a moving process of music data according to the invention.

In the embodiment, the interlocking operation can be performed between the music server 50 and portable recording and reproducing apparatus 70. For example, when the music data is moved from the music server 50 to the portable recording and reproducing apparatus 70, the interlocking operation between the server 50 and apparatus 70 is executed. FIG. 9 shows a flowchart of an example of such a move.

In first step S40, a check is made to see if the music server 50 and portable recording and reproducing apparatus 70 have been connected by the interfaces 34 and 35. The connection between the server 50 and apparatus 70 is detected by, for example, transmitting and receiving a predetermined signal between the interfaces 34 and 35. The detection of the connection between the server 50 and apparatus 70 is not limited to this method but the connection between the server 50 and apparatus 70 can be also detected by using a mechanical detecting mechanism by providing a switching mechanism to the portion where the music server 50 and portable recording and reproducing apparatus 70 are connected.

When the connection between the server 50 and apparatus 70 is confirmed in step S40, a check is made in next step S41 to see if the. move of the music data recorded and accumulated in the HDD 10 to the portable recording and reproducing apparatus 70 has been requested. For example, a list of the information as well as the music piece titles of the compression music data accumulated in the HDD 10 is displayed on the display unit 53 and the user selects predetermined compression music data from the list displayed in the display unit 53 by using a predetermined pointing device of an input operating unit 1. Further, an instruction for move to the portable recording and reproducing apparatus 70 is inputted from the input operating unit 1 to the compression music data selected by the user.

Various methods of inputting the instruction for move using the input operating unit 1 are considered. For example, a button to instruct the move is displayed on the display unit 53 and by designating this button by using the pointing device of the input operating unit 1, the move can be instructed. For example, the move can be also instructed by using what is called a drag & drop such that an icon is displayed on the display unit 53 every compression music data and the icon displayed on the display unit 53 is moved onto an icon indicative of the portable recording and reproducing apparatus 70 on the move destination side also displayed on the display unit 53. The move can be also instructed by the operation of the operation switch provided for the input operating unit 1.

When it is determined in step S41 that there is a moving request of the compression music data, a file size of the compression music data whose move has been designated, namely, a data amount is examined by, for example, the CPU 8 on the server 50 side in step S42. In next step S43, a vacant capacity of the HDD 106, namely, a recordable memory capacity is checked by, for example, the CPU 105 of the portable recording and reproducing apparatus 70. The vacant capacity of the HDD 106 and the file size of the compression music data whose move has been designated and which was examined in step S42 are compared by, for instance, the CPU 8 of the server 50. On the basis of a comparison result in step S42, the CPU 8 discriminates whether the compression music data in which the move has been designated can be recorded to the HDD 106. If it can be recorded to the HDD 106, the processing routine advances to step S45 and the transfer of the compression music data in which the move from the server 50 toward the apparatus 70 has been designated is started.

When it is determined in step S43 that the vacant capacity in the HDD 106 of the portable recording and reproducing apparatus 70 is insufficient, the processing routine advances to step S44. In step S44, the compression music data which has already been recorded to the HDD 106 is deleted automatically or on the basis of a procedure or method, which will be explained hereinafter, by the CPU 105 of the apparatus 70 so that the compression music data whose move has been designated can be recorded to the HDD 106. The processing routine advances to step S45.

The deletion of the compression music data in step S44 is automatically performed under control of the CPU 105 on the basis of a predetermined parameter in the compression music data which has already been recorded in the HDD 106. Of r example, in the portable recording and reproducing apparatus 70, there is considered a method whereby the number of reproducing times is counted every time compression music data is recorded in the HDD 106 and the compression music data is sequentially deleted from the HDD 106 in accordance with the order from the data in which the number of reproducing times is small. The compression music data recorded on the HDD 106 can be also sequentially deleted from the data when the date of recording to the HDD 106 is old.

There can be also a situation such that when the compression music data is automatically deleted from the HDD 106 in step S44, the compression music data which is important to the user is deleted from the HDD 106. To prevent such a situation, it is also possible to display a warning showing that the apparatus is in an operating mode in which the compression music data is automatically deleted from the HDD 106, a list of data to be deleted is displayed, or the like to the display unit 53 of the music server 50 or the LCD 120 of the portable recording and reproducing apparatus 70 and to delete the compression music data from the HDD 106 after obtaining a confirmation of the user. It is also possible to use a method whereby a list of the compression music data which has already been recorded in the HDD 106 is displayed to the display unit 53 of the music server 50 or the LCD 120 of the portable recording and reproducing apparatus 70 and the user himself selects the compression music data to be deleted.

By the processes in steps S43 and S44 mentioned above, when the apparatus is set into a state where the compression music data whose move has been designated in the compression music data stored on the HDD 10 can be recorded to the HDD 106, the transmission, namely, transfer of the compression music data from the music server 50 to the portable recording and reproducing apparatus 70 is started in step S45. That is, the compression music data read out from the HDD 10 is supplied to the portable recording and reproducing apparatus 70 through the bus 40 and interface 34. In the portable recording and reproducing apparatus 70, the compression music data supplied through the interface 34 is recorded to the HDD 106 through the interface 35.

The transferred compression music data also exists in the HDD 10 on the music server 50 side in a manner similar to the case before the transfer to the apparatus 70. In the embodiment, the reproduction of the compression music data which has already been transferred to the apparatus 70, namely, the compression music data which has been moved to the apparatus 70 and exists in the HDD 10 is inhibited (step S46). For example, a reproduction inhibition flag indicative of the inhibition of the reproduction is set to the high level for the compression music data on the HDD 10 at a time point of the completion of the move to the apparatus 70. By the reproduction inhibition flag, the reproduction of the compression music data moved to the apparatus 70 is inhibited by the CPU 8 of the server 50 and the compression music data stored on the HDD 10 is virtually moved from the music server 50 to the portable recording and reproducing apparatus 70. Therefore, the music data which can be reproduced by the server 50 or apparatus 70 in a plurality of compression music data is managed so that only one data always exists, and the illegal copy of the music data is prevented.

In next step S47, a check is made to see if there is a moving request of the next compression music data to the apparatus 70. If the user further wants to move the other compression music data, the processing routine is returned to step S42. When there is not a moving request of music data any more, a series of moving processes of the music data is finished.

Although the explanation has been made above with respect to the case of moving one unit of compression music data in a plurality of compression music data stored on the HDD 10 in steps S42 to S46 in the flowchart of FIG. 9 from the server 50 to apparatus 70, the invention is not limited to this example. A plurality of compression music data can be also collectively moved from the server 50 to the apparatus 70.

Although the description has been made in the foregoing embodiment on the assumption that, in the process in step S46, the compression music data itself exists on the HDD 10 of the music server 50 serving as a moving source side while the reproduction of the moved compression music data is merely inhibited, the invention is not limited to such an example and the moved compression music data can be also deleted from the HDD 10, namely, the data itself can be erased.

The example in which the compression music data is moved from the music server 50 to the portable recording and reproducing apparatus 70 has been described in the above embodiment. However, the move in the opposite direction, namely, the operation such that the compression music data recorded in the HDD 106 of the portable recording and reproducing apparatus 70 is moved to the HDD 10 of the music server 50 can be also executed in accordance with processes similar to those in the flowchart shown in FIG. 9.

In this instance, the compression music data moved from the music server 50 to the portable recording and reproducing apparatus 70 is again moved from the portable recording and reproducing apparatus 70 to the music server 50, so that the reproduction inhibition flag of the compression music data moved from the apparatus 70 in a plurality of compression music data stored on the HDD 10 is cancelled in the music server 50. That is, the compression music data serving as a moving source can be again reproduced in the music server 50 by cancelling the reproduction inhibition flag. At this time, as for the moved compression music data which had been stored on the HDD 106 of the apparatus 70, the data itself is deleted from the HDD 106 or the management data of the moved compression music data is deleted from the management table of the HDD 106.

In the foregoing music server 50 and portable recording and reproducing apparatus 70, the digital copy of music data to the other music server 50 or another digital recording medium is limited for the purpose of copyright protection and, for instance, an accounting is necessary each time the digital copying operation is performed as mentioned above. As mentioned above, although the music data can be moved from the music server 50 to the portable recording and reproducing apparatus 70, the digital copy is limited due to the above reasons.

However, if the accounting is performed for every digital copy of music data or if the digital copy of music data is perfectly inhibited, it is difficult to use the apparatus as a commercially available apparatus and there is a fear such that the apparatus becomes a remarkably user-unfriendly product. In the invention, therefore, by applying a predetermined limitation to music data, the copy of the music data is permitted. In the embodiment, a quality of music data is deteriorated at the time of copy.

Figure 10A:
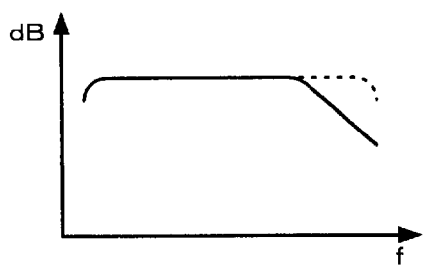
FIGS. 10A and 10B are schematic diagrams showing an example of a method of a sound quality deteriorating process.
Figure 10B:
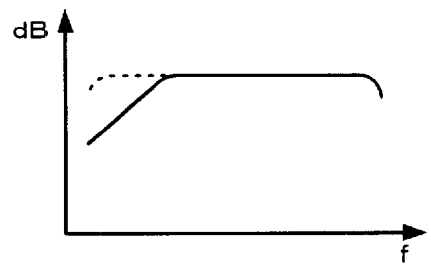
Figure 11A:
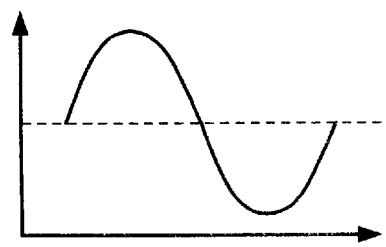
FIGS. 11A and 11B are schematic diagrams showing an example of a method of a sound quality deteriorating process.
Figure 11B:
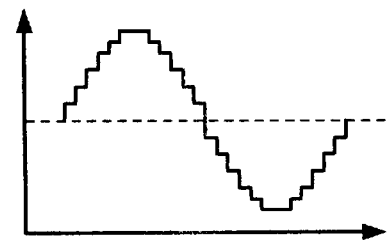

FIGS. 10A to 15C show examples of a method of deteriorating the sound quality of music data. FIGS. 10A and 10B show the example in which frequency characteristics of original music data are deteriorated by using, for instance, a digital filter. As shown by a solid line in FIG. 10A, high band components of the frequency characteristics of the original music data shown by a broken line in FIG. 10A is deteriorated. Low band components of the frequency characteristics of the original music data can be also deteriorated as shown in FIG. 10B. FIGS. 11A and 11B show the example in which the number of quantization bits of music data is deteriorated. For instance, assuming that the number of quantization bits of original music data shown in FIG. 11A is equal to 16 bits/sample, as conceptually shown in FIG. 11B, the number of quantization bits is reduced to 8 bits/sample.

Figure 12A:
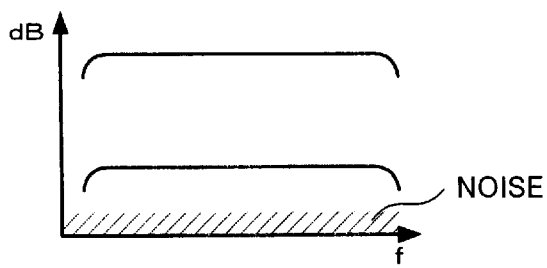
FIGS. 12A and 12B are schematic diagrams showing an example of a method of a sound quality deteriorating process.
Figure 12B:
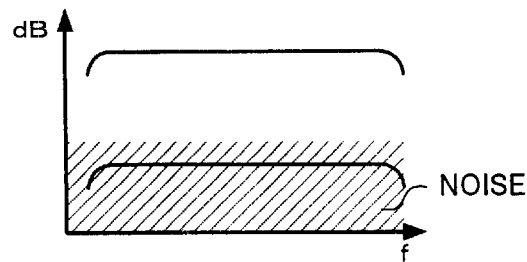
Figure 13A:
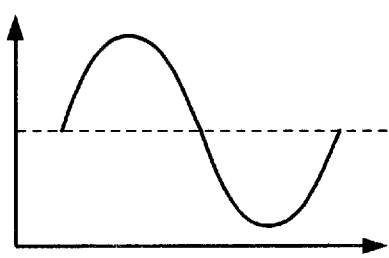
FIGS. 13A and 13B are schematic diagrams showing an example of a method of a sound quality deteriorating process.
Figure 13B:
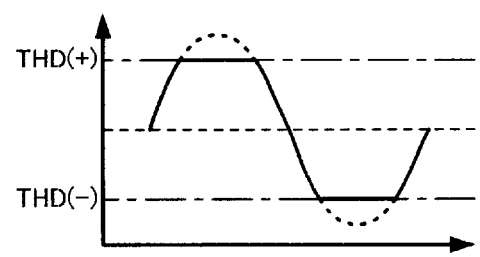

FIGS. 12A and 12B show the example of a method of increasing noise components included in music data. In the original music data, as shown in FIG. 12A, the noises are suppressed to a level that is further smaller than that of the music data of a small sound volume, for example, music data of the minimum sound volume or the minimum level of the reproduced reproduction signal. As shown in an example in FIG. 12B, the noise components are increased so that the noise level is larger than the level of the music data of a small sound volume or the minimum level of the reproduction signal obtained by reproducing the music data. A noise component is newly added to the noise component that is inherently included or exists in the music data or the like. FIGS. 13A and 13B show the example in which the peak of original music data or the signal obtained by reproducing the music data is clipped. For a waveform of the original music data shown by a solid line in FIG. 13A or of the reproduction signal obtained by reproducing the original music data, as shown in an example in FIG. 13B, a threshold THD is provided for a predetermined level as shown by an alternate long and short dash line in FIG. 13B and the waveform of the music data or of the reproduction signal obtained by reproducing the music data is clipped as shown by a solid line in FIG. 13B.

Figure 14A:
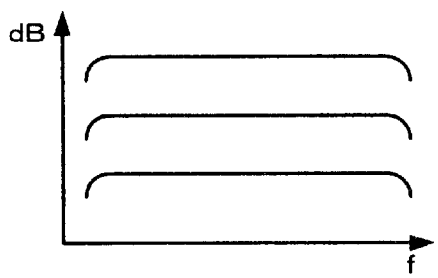
FIGS. 14A and 14B are schematic diagrams showing an example of a method of a sound quality deteriorating process.
Figure 14B:
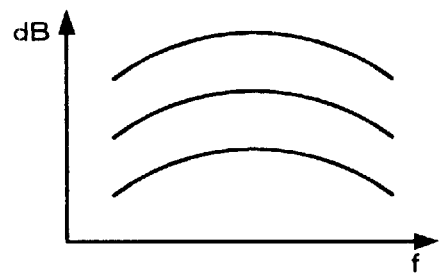
Figure 15A:
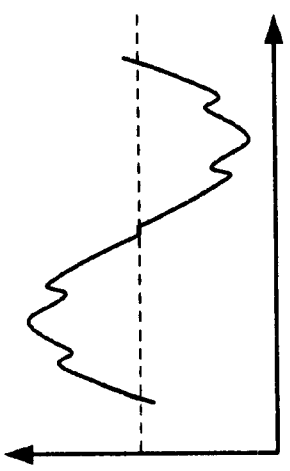
FIGS. 15A to 15C are schematic diagrams showing an example of a method of a sound quality deteriorating process.
Figure 15B:
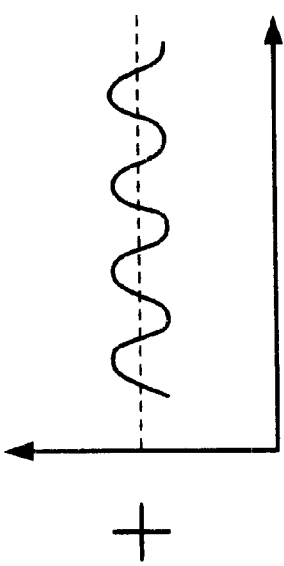
Figure 15C:
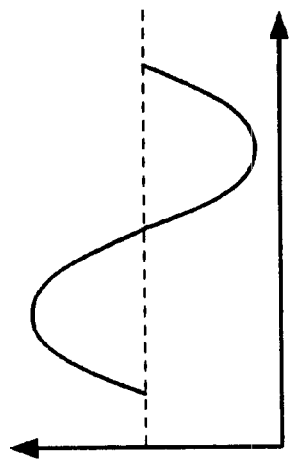

FIGS. 14A and 14B show the example in which a frequency distribution of the original music data is changed. For instance, in the case where the frequency distribution of the original music data is flat as shown in FIG. 14A, the characteristics are compressed in the low and high bands of the frequency distribution as shown in FIG. 14B. FIGS. 15A, 15B, and 15C show the example of the method of adding another signal to original music data. Another signal of a different waveform as shown in an example in FIG. 15B is added to the reproduction signal obtained by reproducing the original music data shown in FIG. 15A and the signal as music data having a waveform as shown in FIG. 15C is generated, thereby deteriorating a quality of the music data, for example, a sound quality upon reproduction of the music data.

The methods of deteriorating the sound quality shown above are mere examples. Another method can be also used so long as the quality of the original music data is changed and the data is deteriorated. For example, a method of converting the original music data to music data of a lower sampling frequency is also considered. A method of compressing a dynamic range of the original music data is also considered. Further, a method of narrowing a frequency band of music data by applying a band pass filter to the original music data is also considered. Stereophonic music data can be also converted into monaural music data.

The above processes for deteriorating the quality of music data are performed by a method whereby, for example, the music data read out from the HDD 10 is once supplied to the compression decoder 21 in case of the music server 50 and the compression encoding is released and the music data in which the compression encoding has been released is supplied to the CPU 8 and a software process is executed. It is also possible to execute the processes for deteriorating the quality of original sound data in a hardware manner by adding a DSP (Digital Signal Processor) to the construction shown in FIGS. 2, 3, or 4 mentioned above. That is, the compression encoding of the music data read out from the HDD 10 for the purpose of, for example, copy is released through the compression decoder 21 and the resultant music data is supplied to the added DSP. The music data subjected to a predetermined sound quality deteriorating process by the added DSP is derived to, for instance, the interface 34 through the bus 40.

Figure 16:
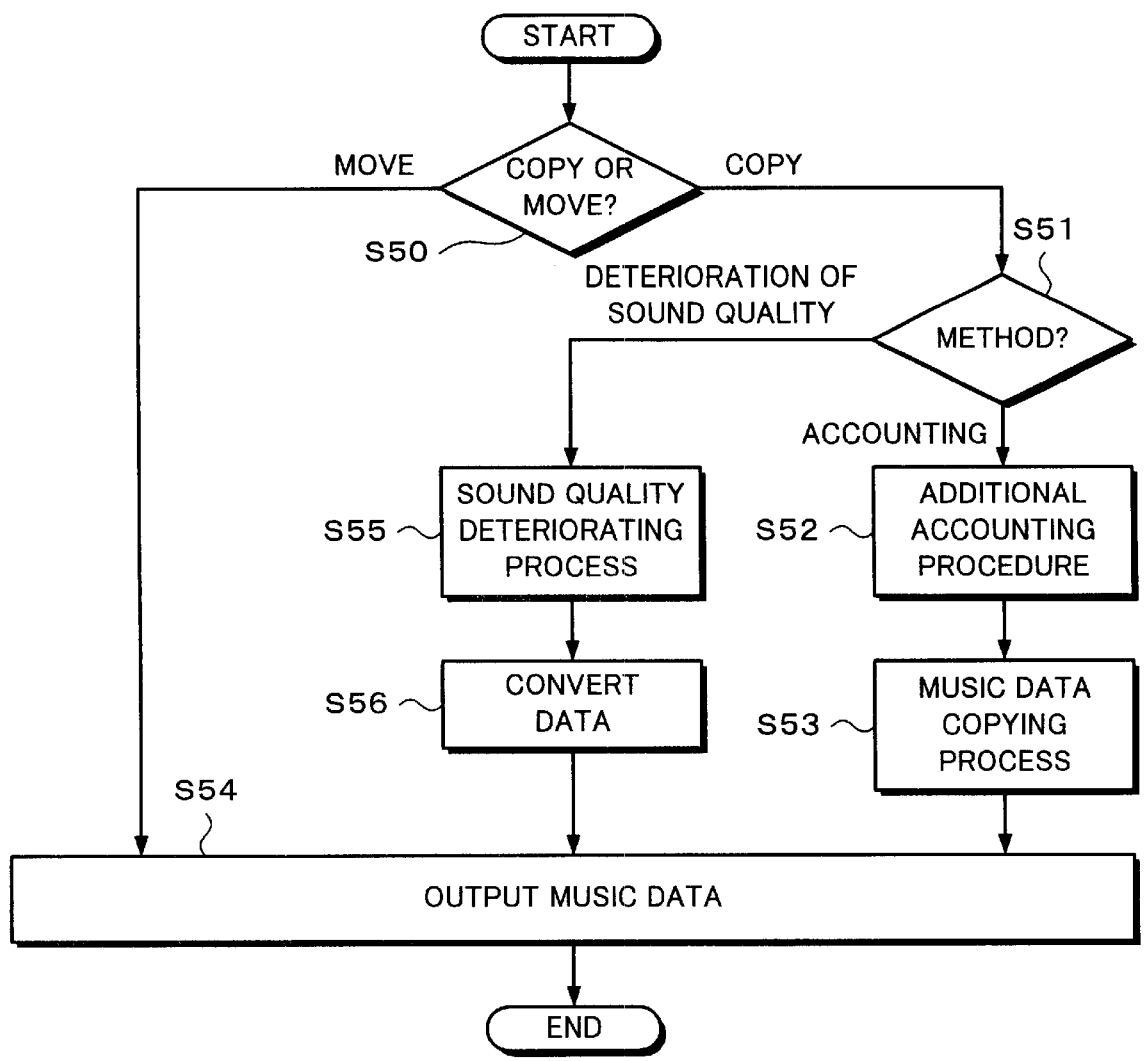
FIG. 16 is a flowchart showing an example of a process to select one of the accounting process and the sound quality deteriorating process when music data is copied.

The foregoing accounting process and sound quality deteriorating process upon copying of the music data can be selectively performed. FIG. 16 shows a flowchart for an example of the processes for selectively performing the accounting process and the sound quality deteriorating process at that time. When the music data recorded in the HDD 10 is moved to another recording medium, for example, the disc of the HDD 106 of the portable recording and reproducing apparatus 70 (step S50), the accounting and sound quality deteriorating processes are not performed. The processing routine is shifted to step S54 and the music data read out from the HDD 10 is outputted, for example, through the interface 34.

An instruction of the moving and copying processes of music data is instructed by, for example, operating an operation switch provided for the input operating unit 1 of the music server 50 by the user. They can be also instructed by performing, for instance, a drag & drop of an icon by the input operating unit 1 in accordance with the display contents on the display unit 53.

When the copy of music data is instructed by using the input operating unit 1 or the like in step S50, the processing routine advances to step S51 and either the sound quality deteriorating process or the accounting process is selected as a copying method. The selection between the accounting process and the sound quality deteriorating process in step S51 is performed by the user by, for example, the switching operation of the input operating unit 1 of the music server or by the operation by the input operating unit 1 which is executed in accordance with the display contents on the display unit 53. Besides the method whereby the user selects either the accounting process or the sound quality deteriorating process, when the music server 50 is not connected to the internet server 60, the sound quality deteriorating process can be also automatically selected.

When the accounting process is selected in step S51, the processing routine advances to step S52 and a procedure for the additional accounting is executed. That is, the music server 50 is connected to the internet server 60 through the communication line 61. A reception and a transmission of data are executed between the music server 50 and internet server 60 and the accounting process similar to step S32 in FIG. 8B mentioned above is performed. The copying process of the music data is executed in step S53. In the copying process of the music data, for example, the designated music data is read out from the HDD 10 and is outputted from the interface 34 (step S54). The music data of the copying source is preserved as it is on the HDD 10. The music data outputted from the interface 34 in step S54 is supplied to the recording and reproducing apparatus and is recorded onto another memory medium.

When the sound quality deteriorating process is selected in step S51, a sound quality deteriorating system is activated in step S55. In step S56, the designated music data is read out from the HDD 10, the read-out music data is data converted by any one of the foregoing sound quality deteriorating methods, and a data process is performed so that the sound quality of music data is deteriorated. As a method of deteriorating the sound quality by the sound quality deteriorating process, it can be preliminarily fixed to one method or a proper one of a plurality of methods can be also selected by the user. The music data in which the data conversion was performed and the sound quality was deteriorated is outputted, for example, from the interface 34 in step S54, supplied to another recording and reproducing apparatus, and stored onto another memory medium as mentioned above.

Information showing that the move and copy have been executed can be added to the moved and copied music data. For example, a flag showing that the data is the moved or copied data is added to a header portion of the moved or copied music data. As an example, a flag "M" is set to the music data which has been moved from the HDD 10 and exists on the move destination side. A flag "C" is set in the header portion of the music data which has been read out from the HDD 10 and copied. The move and copy of the music data can be managed by using the flag of the header portion of the music data in the recording and reproducing apparatus to which the music data was moved or copied. It is also possible to count the number of times of move or copy and to add a count value as data to the header portion of the moved or copied music data. By recording the data obtained by counting the number of times of move or copy to the header portion, it is possible to know whether the music data is the data after the move of a number of times or the data of a copy of which number the times of copy processing operation was performed on the original music data, or the like.

The value obtained by counting the number of times of move or copy is recorded as data to the header portion of the moved or copied music data, so that the number of times of move or copy of the music data can be limited. For example, an upper limit of the number of moving times of music data is preset and when the number of moving times exceeds the set number of times, it is judged that the move is illegal. It is also possible to construct in a manner such that data to set or specify a partner destination of the move of the data to be recorded is recorded to the header portion of the music data and, when the data is moved to a partner other than the set partner, it is judged that the move is illegal on the basis of the data which has been recorded in the header portion of the music data and indicates the partner destination of the move. It is possible to perform a control such that the illegal move is inhibited or the foregoing sound quality deteriorating process or accounting process is performed to the illegal move on the basis of the data which has been recorded in the header portion of the music data and indicates the number of moving times.

As described above, according to the invention, when the music data recorded in the music server is digitally copied to another recording medium, the accounting process is executed. Therefore, there is an effect such that the digital copy of the digital music data can be performed while protecting the copyright.

According to the invention, since the music data recorded in the music server is digitally copied to another recording medium by deteriorating the sound quality, there is an effect such that even if the accounting is not performed, the digital music data can be copied while protecting the copyright.

By using the invention, since the digital music data can be copied while protecting the copyright, the music data can be spread in a wide range. Therefore, there is an effect such that it is also very preferable for the author side.

What is claimed is:

1. A data storage terminal apparatus comprising:
   a first storing unit for storing data provided by a user from a record medium located at said data storage terminal;
   a second storing unit for storing data therein; and
   control means for performing in response to a user input one of
      a charging process for charging a fee to said user for copying data from said first storing unit to said second storing unit, reading out data from said first storing unit, and supplying said read out data into said second storing unit, and
      a quality deteriorating process for reading out data from said first storing unit, deteriorating a quality of said read-out data, and supplying said quality deteriorated data into said second storing unit.

2. The data storage apparatus according to claim 1, wherein
   said control means performs one of said charging process and said quality deteriorating process when the data read out from said first storing unit is copied into said second storing unit.

3. The data storage apparatus according to claim 2, wherein
   said control means does not perform any one of said charging process and said quality deteriorating process of said data when the data read out from said first storing unit is stored into said second storing unit and a reproduction of the data supplied and stored into said second storing unit is inhibited in said first storing unit.

4. The data storage apparatus according to claim 1, wherein
   the data which is stored in said first storing unit is music data and said control means performs a process to quality deteriorate frequency characteristics of the music data read out from said first storing unit.

5. The data storage apparatus according to claim 4, wherein
   said control means quality deteriorates high band frequency components of the frequency characteristics of the music data read out from said first storing unit.

6. The data storage apparatus according to claim 4, wherein
   said control means quality deteriorates low band frequency components of the frequency characteristics of the music data read out from said first storing unit.

7. The data storage apparatus according to claim 1, wherein
   said control means performs a process to quality deteriorate a number of quantization bits of the data read out from said first storing unit.

8. The data storage apparatus according to claim 1, wherein
   said control means performs a process to add a noise component to the data read out from said first storing unit.

9. The data storage apparatus according to claim 8, wherein
   the noise component which is added by said control means has a level larger than a level of music data of a minimum sound volume.

10. The data storage apparatus according to claim 8, wherein
    said control means performs a process to clip a signal obtained by reproducing the data read out from said first storing unit.

11. The data storage apparatus according to claim 8, wherein
    the data which is stored into said first storing unit is music data and said control means performs a process to change a frequency distribution of the music data read out from said first storing unit.

12. The data storage apparatus according to claim 8, wherein
    said control means performs a process to add other data to the data read out from said first storing unit.

13. The data storage apparatus according to claim 12, wherein
    said control means performs a process to add a signal having a waveform different from that of a reproduction signal obtained by reproducing the data read out from said first storing unit to said reproduction signal.

14. A data storing method, comprising the steps of:
    selecting in response to a user input one of
       a charging process for charging a fee to a user for copying data provided by a user from a record medium located at a terminal from a first storing unit in said terminal to a second storing unit in said terminal, reading out data from said first storing unit, and supplying said read out data into said second storing unit, and
       a quality deteriorating process for reading out data from said first storing unit, deteriorating a quality of said read out data, and supplying said quality deteriorated data into said second storing unit; and
    performing said selected process.

15. The data storing method according to claim 14, wherein
    one of said charging process and said quality deteriorating process is performed when the data read out from said first storing unit is copied into said second storing unit.

16. The data storing method according to claim 15, wherein
one of said charging process and said quality deteriorating process of said data is not performed when the data readout from said first storing unit is stored into said second storing unit and a reproduction of the data supplied and stored into said second storing unit is inhibited in said first storing unit.

17. A data processing terminal apparatus comprising:

storage means for storing data provided by a user from a record medium located at said data processing terminal apparatus; and signal processing means for performing in response to a user input one of
a charging process for charging a fee to said user for copying said data provided by said user from said storage means to an other storage means, reading out data from said storage means, and supplying said read out data into said other storage means, and
a quality deteriorating process for reading out data from said storage means, deteriorating a quality of said read out data, and supplying said quality deteriorating data into said other storage means.

18. The data processing apparatus according to claim 17, wherein
the data which is stored in said storage means is music data and said signal processing means performs a process to quality deteriorate frequency characteristics of the music data read out from said storage means.

19. The data processing apparatus according to claim 18, wherein
said signal processing means quality deteriorates high band frequency components of the frequency characteristics of the music data read out from said storage means.

20. The data processing apparatus according to claim 18, wherein
said signal processing means quality deteriorates low band frequency components of the frequency characteristics of the music data read out from said storage means.

21. The data processing apparatus according to claim 18, wherein
said signal processing means performs a process to quality deteriorate a number of quantization bits of the data read out from said storage means.

22. The data processing apparatus according to claim 18, wherein
said signal processing means performs a process to add a noise component to the data read out from said storage means.

23. The data processing apparatus according to claim 22, wherein
the noise component which is added by said signal processing means has a level larger than a level of music data of a minimum sound volume.

24. The data processing apparatus according to claim 18, wherein
said signal processing means performs a process to clip a signal obtained by reproducing the data read out from said storage means.

25. The data processing apparatus according to claim 18, wherein
the data which is stored into said storage means is music data and said signal processing means performs a process to change a frequency distribution of the music data read out from said storage unit.

26. The data processing apparatus according to claim 18, wherein
said signal processing means performs a process to add other data to the data read out from said storage means.

27. The data storage apparatus according to claim 1, wherein
said control means charges said fee to said user by sending copy request information to a server in said charging process, said server charges said fee to a user account according to said copy request information.

28. The data storage apparatus according to claim 1, wherein
said control means charges said fee to said user by subtracting said fee from a money amount recorded in a prepaid card in said charging process, said prepaid card is provided for said data storage apparatus.

29. A data storage terminal apparatus comprising:

a storage device for storing a plurality of data provided by a user from a record medium located at said data storage terminal apparatus;

an operating device for selecting in response to a user input one of
a charging process for charging a fee to said user for copying said data provided by said user from said storage device to an other storage device, reading out data from said storage device, and supplying said read out data into said other storage device, and
a quality deteriorating process for reading out data from said storage device, deteriorating a quality of said read-out data, and supplying said quality deteriorated data into said other storage device; and
a controller for controlling said selected process.

30. A data storing method for use with a data storing terminal apparatus comprising the steps of:

selecting one of a first mode and a second mode according to a user instruction;

moving data provided by a user from a record medium located at the data storing terminal apparatus from a first storage device in said data storing terminal apparatus into a second storage device in said data storing terminal apparatus when said selected mode is said first mode;

selecting one of a charging process and a quality deteriorating process according to said user instruction when said selected mode is said second mode;

charging a fee to said user and copying data from said first storage device into said second storage device when said selected process is said charging process; and reading out data from said storage device, quality deteriorating said read out data, and storing said quality deteriorated data into said second storage device when said selected process is said quality deteriorating process.

* * * * *